United States Patent
Ohkubo et al.

(10) Patent No.: US 11,681,239 B2
(45) Date of Patent: Jun. 20, 2023

(54) OPTICAL MEMBER, OPTICAL SCANNING DEVICE, AND IMAGE FORMING DEVICE

(71) Applicant: SHARP KABUSHIKI KAISHA, Sakai (JP)

(72) Inventors: Kenzo Ohkubo, Sakai (JP); Manabu Matsuo, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/226,875

(22) Filed: Apr. 9, 2021

(65) Prior Publication Data

US 2021/0349408 A1 Nov. 11, 2021

(30) Foreign Application Priority Data

May 11, 2020 (JP) .............................. JP2020-083117

(51) Int. Cl.
| | |
|---|---|
| G03G 15/20 | (2006.01) |
| G03G 15/04 | (2006.01) |
| G02B 7/02 | (2021.01) |
| G02B 26/12 | (2006.01) |
| G02B 26/08 | (2006.01) |

(52) U.S. Cl.
CPC ....... *G03G 15/04036* (2013.01); *G02B 7/021* (2013.01); *G02B 26/0816* (2013.01); *G02B 26/125* (2013.01)

(58) Field of Classification Search
USPC ...................................................... 399/218
See application file for complete search history.

(56) References Cited

U.S. PATENT DOCUMENTS

| | | | |
|---|---|---|---|
| 9,639,935 B1 * | 5/2017 | Douady-Pleven | ..... H04N 19/90 |
| 2020/0133095 A1 * | 4/2020 | Cotoros | ................. G02B 13/18 |

FOREIGN PATENT DOCUMENTS

| | | | | |
|---|---|---|---|---|
| JP | 2001-169168 A | | 6/2001 | |
| JP | 2018152356 A | * | 9/2018 | ............ F21S 41/143 |
| WO | WO-2019232301 A | * | 12/2019 | ............. G02B 13/06 |

OTHER PUBLICATIONS

Electronic Still Camera and Camera; Hiroshi, Tomoaki (Year: 2001).*

* cited by examiner

*Primary Examiner* — Quana Grainger
(74) *Attorney, Agent, or Firm* — ScienBiziP, P.C.

(57) ABSTRACT

An optical member that refracts a light beam to diverge or focus the light beam, includes: at least three pairs of opposing surfaces. Each of the three pairs of opposing surfaces include a lens. Curvatures of the lenses at one side surfaces of the respective three pairs of surfaces are all the same, or curvatures of the lenses at one side surfaces of respective pairs of at least two pairs of the three pairs of surfaces are different from each other, and respective shortest distances between optical axes of the lenses at the one side surfaces of respective pairs of the at least two pairs of surfaces, and reference sides which are each any one of respective sides surrounding surfaces including the lenses are different from each other.

20 Claims, 29 Drawing Sheets

OPTICAL MEMBER, OPTICAL SCANNING DEVICE, AND IMAGE FORMING DEVICE

BACKGROUND OF THE INVENTION

Field of the Invention

The present invention relates to an optical member, an optical scanning device, and an image forming device such as a copy machine, a multifunction peripheral, a printer, and a facsimile machine.

Description of the Background Art

An optical scanning device is generally equipped with a beam detector that receives a light beam from a light source (for example, a laser diode element), and a condensing lens that is arranged on an optical path between the light source and the beam detector and condenses the light beam toward the beam detector. With the beam detector, the optical scanning device detects the main scanning start time of the light beam emitted from the light source and deflection-scanned in a predetermined main scanning direction by a deflection scanning member.

By the way, in an optical scanning device, it is conceivable that an optical member (for example, a condensing lens) is shared by image forming devices or optical scanning devices of various models of electronic devices (for example, various models of image forming devices) provided with the optical scanning device. However, the optical member cannot be shared by various models of image forming devices or optical scanning devices, and a dedicated optical member is, as the case may be, used in various models of image forming devices or optical scanning devices.

In this regard, for example, Japanese Unexamined Patent Application Publication No. 2001-169168 describes that an electronic still camera includes, as optical members, a plurality of pairs of lenses, each pair being composed of a concave lens and a convex lens, and respective lenses have surface shapes different from each other, and therefore the focal lengths in combinations are different from each other, such as a distance that can be taken by close-up photography, a distance that can be taken by a normal photography, and a distance that can be taken by a telephoto photography (see paragraph [0037]), but fails to describe that the optical member is shared by various models of image forming devices or optical scanning devices.

Therefore, it is an object of the present invention to provide an optical scanning device and an image forming device in which an optical member can be shared by various models of image forming devices or optical scanning devices.

SUMMARY OF THE INVENTION

In order to solve the above problems, the present invention provides optical members according to first and second aspects, an optical scanning device, and an image forming device, as shown below.

(1) Optical Member According to First Aspect

According to a first aspect of the present invention, there is provided an optical member that refracts a light beam to diverge or focus the light beam, comprising: at least three pairs of opposing surfaces, wherein each of the three pairs of opposing surfaces include a lens, and curvatures of the lenses at one side surfaces of the respective three pairs of surfaces are all the same.

(2) Optical Member According to Second Aspect

According to a second aspect of the present invention, there is provided an optical member that refracts a light beam to diverge or focus the light beam, comprising: at least three pairs of opposing surfaces, wherein each of the three pairs of opposing surfaces include a lens, curvatures of the lenses at one side surfaces of respective pairs of at least two pairs of the three pairs of surfaces are different from each other, and respective shortest distances between optical axes of the lenses at one side surfaces of respective pairs of the at least two pairs of surfaces, and reference sides which are each any one of respective sides surrounding surfaces including the lenses are different from each other.

(3) Optical Scanning Device

According to a third aspect of the present invention, there is provided an optical scanning device comprising the optical member according to the present invention.

(4) Image Forming Device

According to a fourth aspect of the present invention, there is provided an image forming device (100) comprising the optical scanning device according to the present invention.

According to the present invention, an optical member, despite a simple configuration, can be shared by various models of image forming devices or optical scanning devices.

DESCRIPTION OF THE PREFERRED EMBODIMENTS

Figure 1:
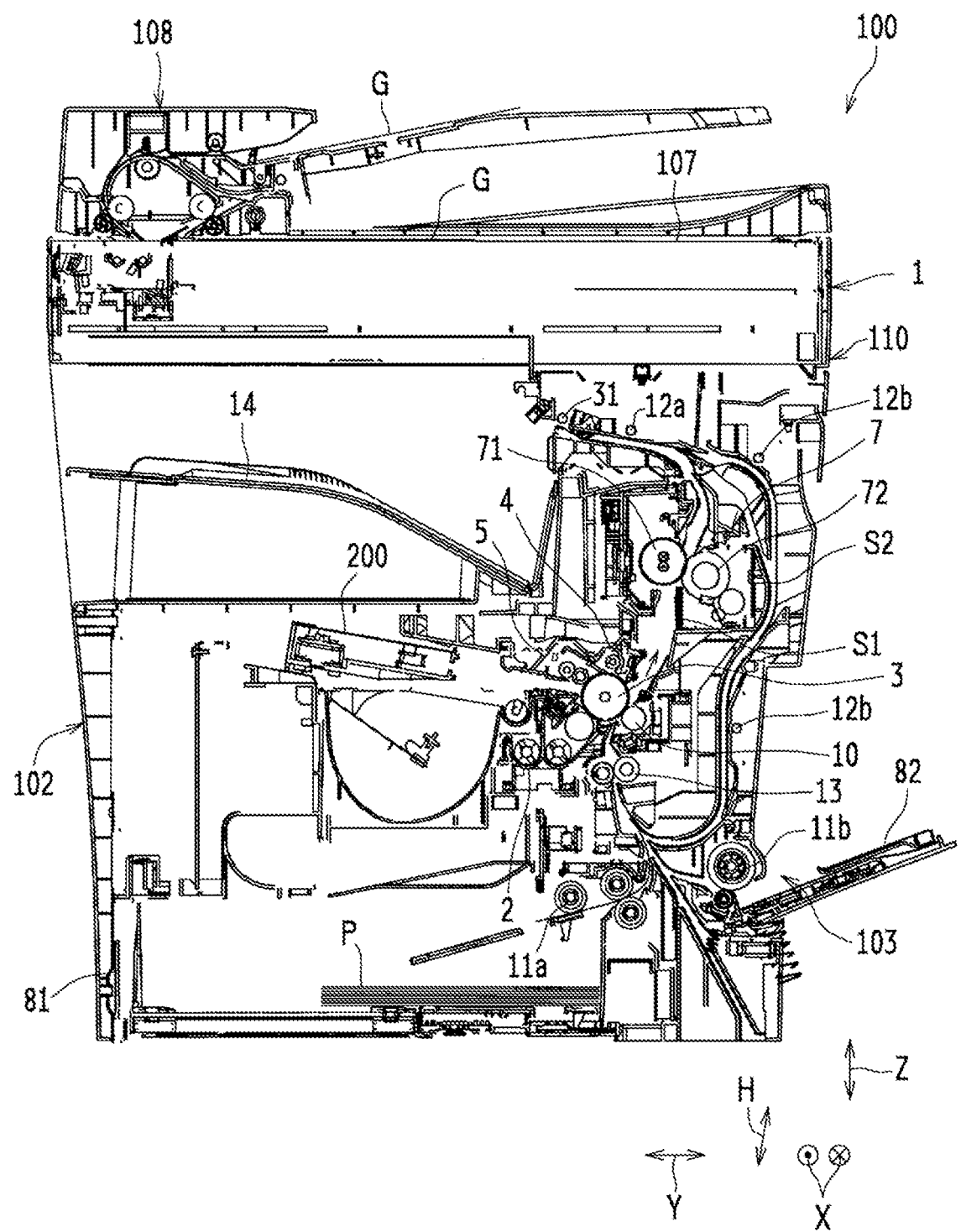
FIG. 1 is a schematic cross-sectional view of an image forming device according to the present embodiment as viewed from the front.

Hereinafter, embodiments according to the present invention will be described with reference to the drawings. In the following description, the same parts are designated by the same reference numerals. The names and functions of these parts are the same. Therefore, the detailed description of these parts will not be repeated.

Image Forming Device

FIG. 1 is a schematic cross-sectional view of an image forming device 100 according to the present embodiment as viewed from the front. In the figure, a reference numeral X represents a depth direction, a reference numeral Y represents a right-left direction, and a reference numeral Z represents an upward-downward direction (vertical direction).

The image forming device 100 according to the present embodiment is a monochrome image forming device. The image forming device 100 performs an image forming process according to image data read by an image reading device 1 or image data transmitted from outside. It is noted that the image forming device 100 may also be a color image forming device that forms multicolor and monochromatic images on paper P.

The image forming device 100 includes a document feeder 108 and an image forming device main body 110. The image forming device main body 110 is provided with an image former 102 and a paper conveying system 103.

The image former 102 includes an optical scanning device 200 (optical scanner), a developer 2, a photoreceptor drum 3 that acts as an electrostatic latent image carrier, a cleaner 4, a charging device 5, and a fixer 7. Further, the paper conveying system 103 includes a paper feed tray 81, a manual paper feed tray 82, a discharge roller 31, and a discharge tray 14.

The image reading device 1 for reading an image of a document G is provided on the upper part of the image forming device main body 110. The image reading device 1 includes a document placing table 107 on which the document G is placed. Further, the document feeder 108 is provided on the upper side of the document placing table 107. In the image forming device 100, the image of the document G read by the image reading device 1 is sent to the image forming device main body 110 as image data, and the image is recorded on the paper P.

The image forming device main body 110 is provided with a paper conveyance path S1. The paper feed tray 81 or the manual paper feed tray 82 supplies the paper P to the paper conveyance path S1. The paper conveyance path S1 guides the paper P to the discharge tray 14 via the transfer roller 10 and the fixer 7. The fixer 7 heat-fixes, onto the paper P, the toner image formed on the paper P. Pickup rollers 11a and 11b, a conveyance roller 12a, a registration roller 13, a transfer roller 10, a heat roller 71 and a pressure roller 72 in the fixer 7, and a discharge roller 31 are arranged in the vicinity of the paper conveyance path S1.

In the image forming device 100, the paper P supplied by the paper feed tray 81 or the manual paper feed tray 82 is conveyed to the registration roller 13. Next, the paper P is conveyed to the transfer roller 10 by the registration roller 13 at the time at which the paper P is aligned with the toner image on the photoreceptor drum 3. The toner image on the photoreceptor drum 3 is transferred onto the paper P by the transfer roller 10. After that, the paper P passes through the heat roller 71 and the pressure roller 72 in the fixer 7 and is discharged onto the discharge tray 14 via the conveyance roller 12a and the discharge roller 31. When an image is formed not only on the front surface of the paper P but also on the back surface of the paper P, the paper P is conveyed in the opposite direction from the discharge roller 31 to a reverse paper conveyance path S2. The front and back of the paper P are reversed and the paper P is again guided to the registration roller 13 via reverse conveyance rollers 12b. Then, after a toner image is formed and fixed on the back surface in the same manner as on the front surface, the paper P is discharged toward the discharge tray 14.

Optical Scanning Device

Figure 2:
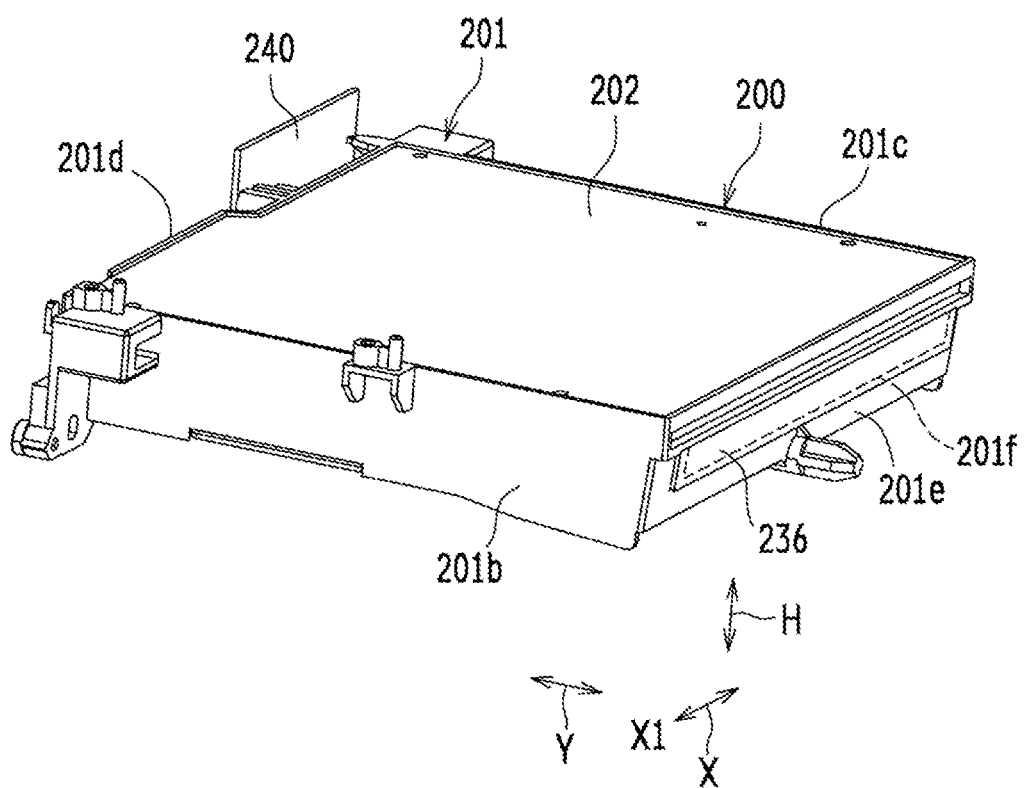
FIG. 2 is a perspective view of the front side of an optical scanning device of the image forming device illustrated in FIG. 1 as viewed from the upper right.
Figure 3:
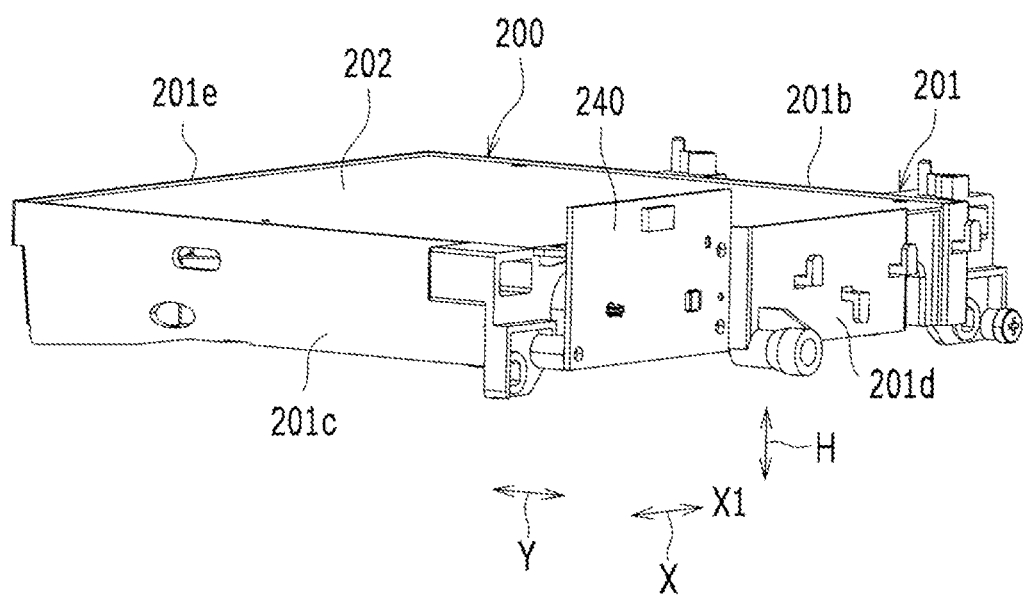
FIG. 3 is a perspective view of the back side of the optical scanning device illustrated in FIG. 2 as viewed from the upper left.
Figure 4:
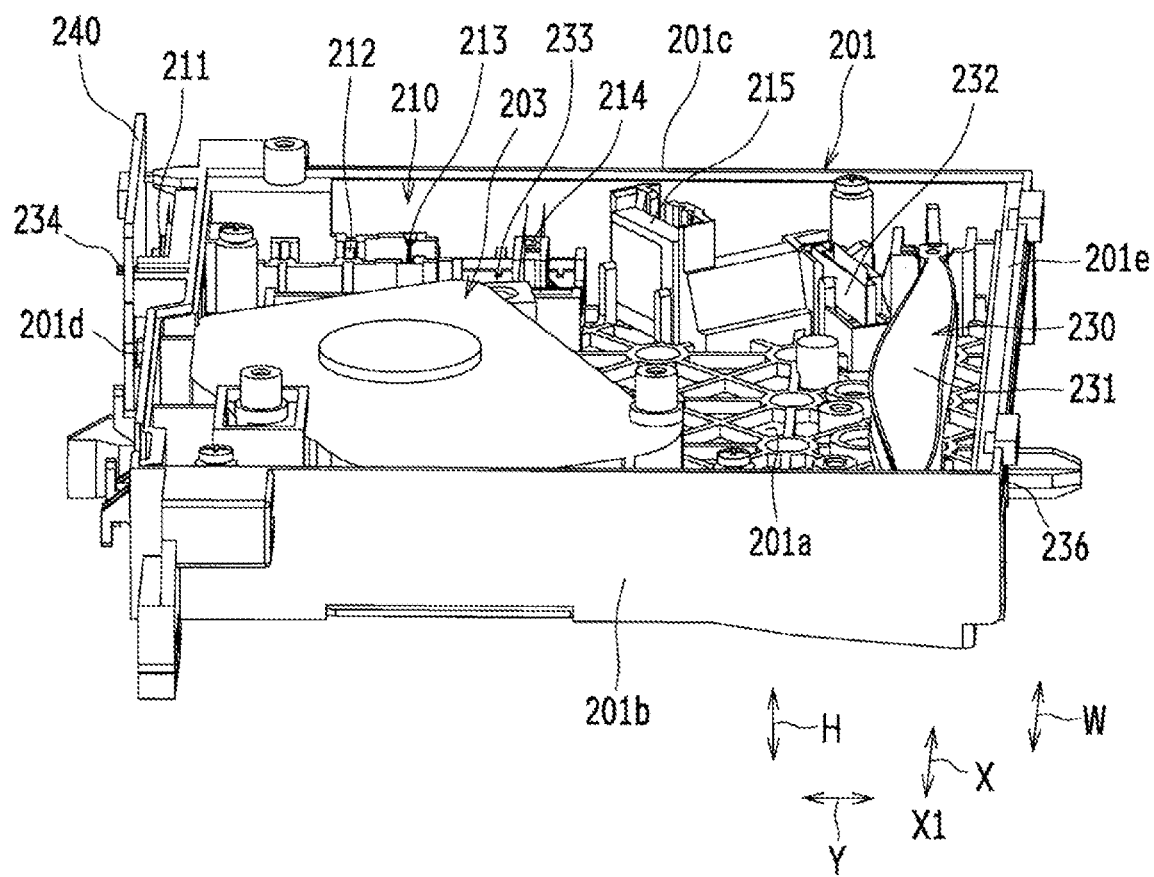
FIG. 4 is a perspective view of the optical scanning device illustrated in FIG. 2, in which the upper lid is removed, as viewed from above on the front side.
Figure 5:
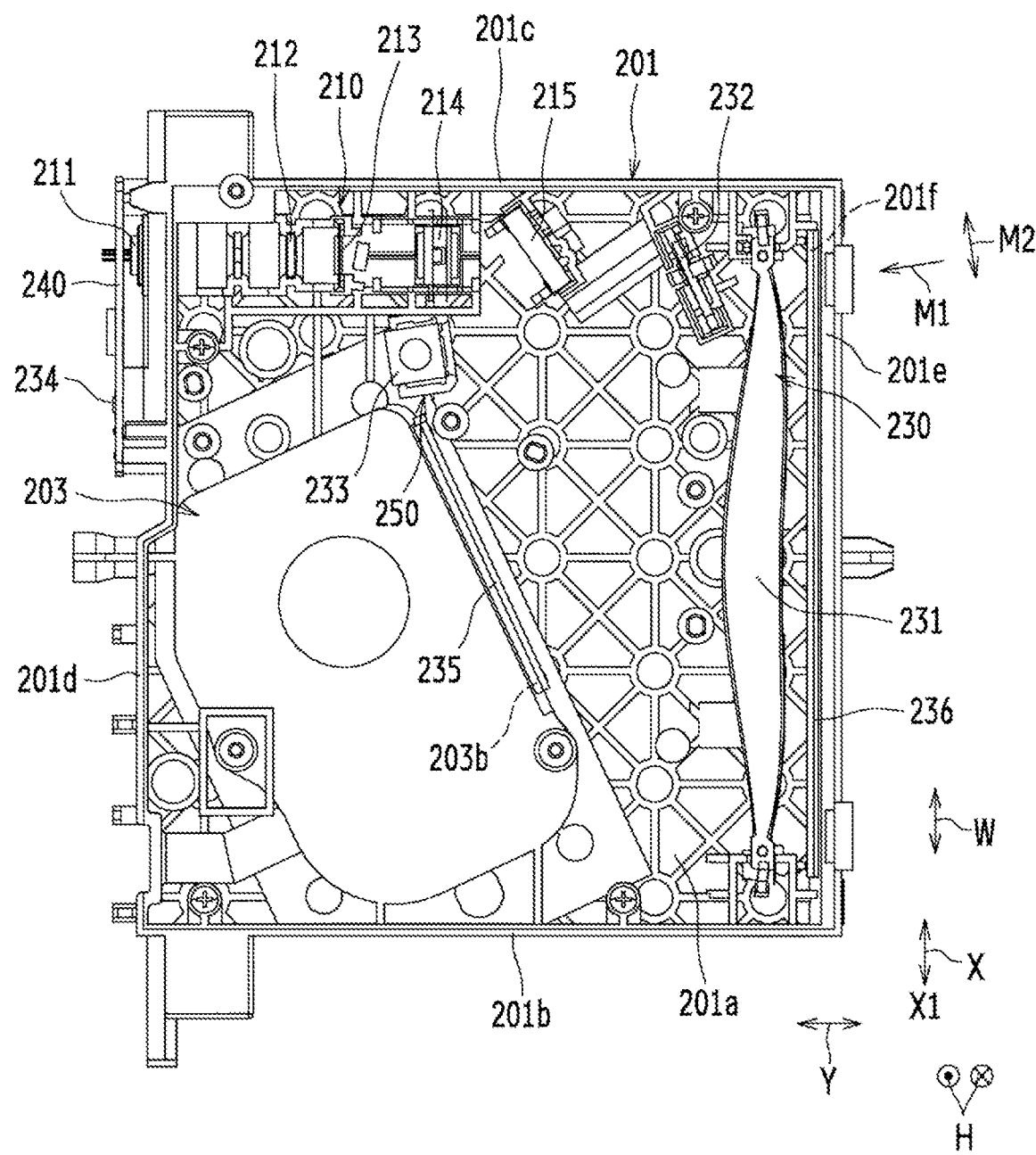
FIG. 5 is a plan view illustrating the optical scanning device illustrated in FIG. 4.
Figure 6:
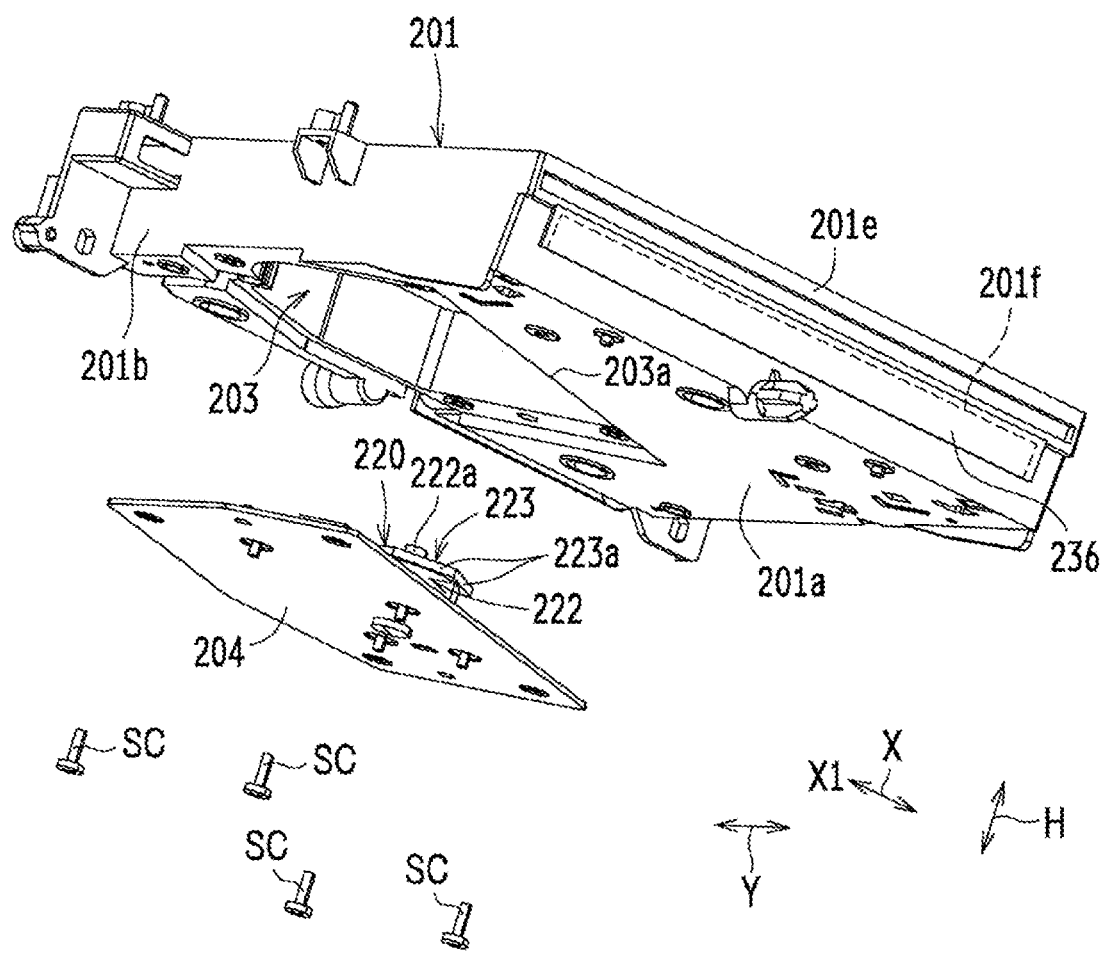
FIG. 6 is an exploded perspective view illustrating a state in which a lower lid of the optical scanning device is removed.
Figure 7:
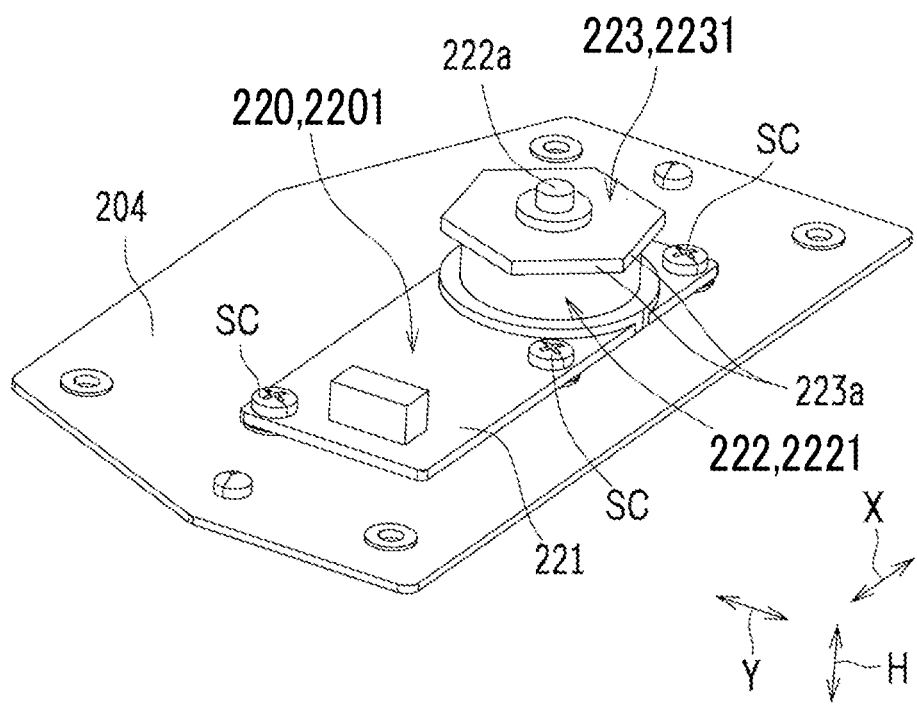
FIG. 7 is a perspective view illustrating an example of a deflection scanner in the optical scanning device.
Figure 8:
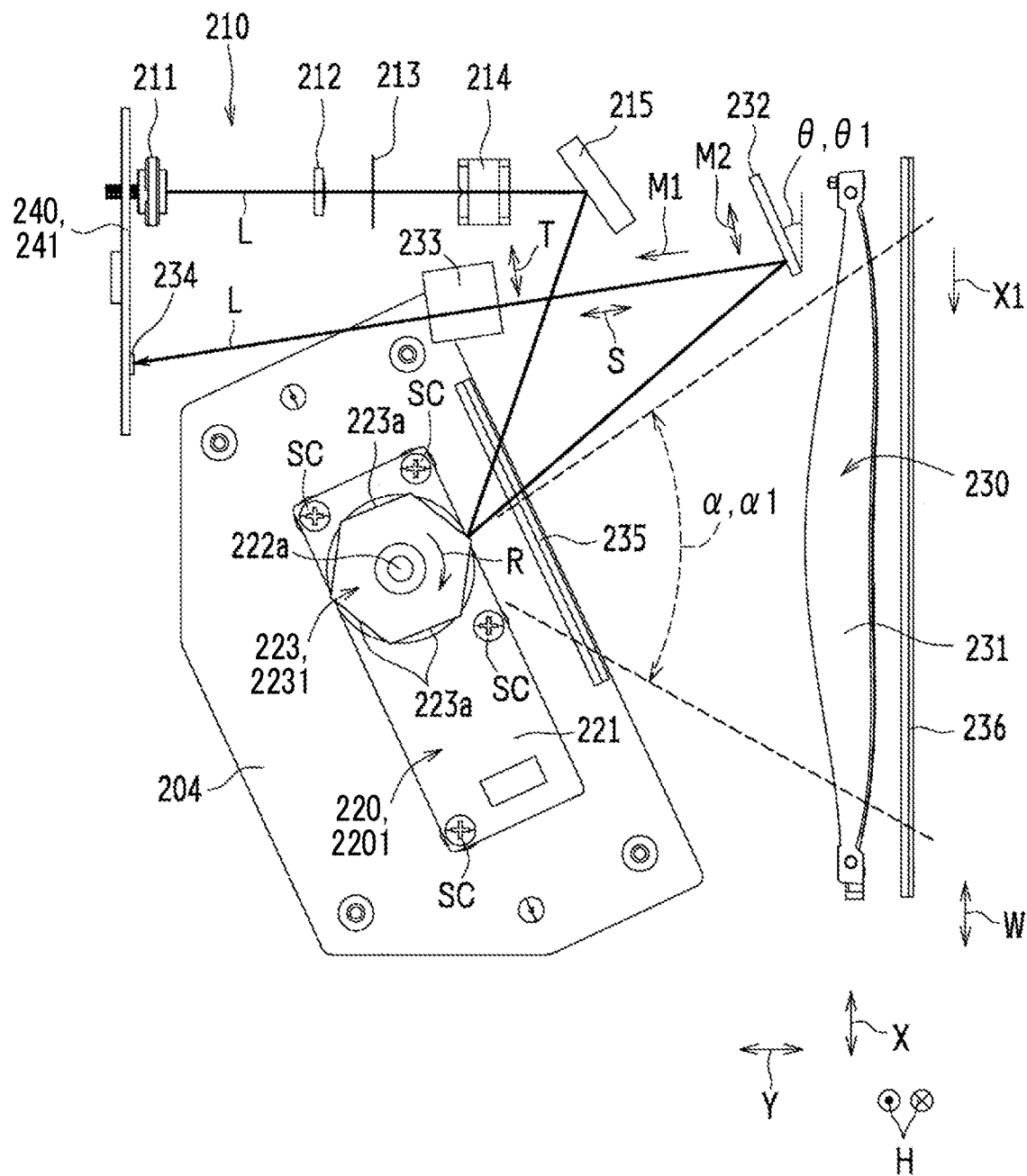
FIG. 8 is a plan view illustrating an example of the configuration of an optical system of a normal size (A3 size) specification of recording paper (paper P) in the optical scanning device.

FIG. 2 is a perspective view of the front side of the optical scanning device 200 in the image forming device 100 illustrated in FIG. 1 as viewed from the upper right. FIG. 3 is a perspective view of the back side of the optical scanning device 200 illustrated in FIG. 2 as viewed from the upper left. FIG. 4 is a perspective view of the optical scanning device 200 illustrated in FIG. 2, in which an upper lid 202 is removed, as viewed from above on the front side. FIG. 5 is a plan view illustrating the optical scanning device 200 illustrated in FIG. 4. FIG. 6 is an exploded perspective view illustrating a state in which a lower lid 204 of the optical scanning device 200 is removed. FIG. 7 is a perspective view illustrating an example of a deflection scanner 220 in the optical scanning device 200. FIG. 8 is a plan view illustrating an example of the configuration of an optical system of a normal size (A3 size) specification of the recording paper (paper P) in the optical scanning device 200.

The optical scanning device 200 includes a housing 201, an incident optical system 210, the deflection scanner 220 (deflection scanning portion), and an emission optical system 230.

The incident optical system 210 includes a light source 211 (laser diode element), a collimator lens 212, an aperture member 213, a cylindrical lens 214, and a light source reflecting mirror 215. The light source 211 emits a light beam L (laser beam). The collimator lens 212 irradiates the aperture member 213 with the light beam L from the light source 211 as substantially parallel light. The aperture member 213 narrows down the light beam L from the collimator lens 212 and irradiates the cylindrical lens 214 with the light beam L. The cylindrical lens 214 causes the light beam L from the aperture member 213 to converge only in the sub-scanning direction and condenses the light beam L on a reflective surface 223a of a deflection scanning member 223 (polygon mirror) via the light source reflecting mirror 215. The light source reflecting mirror 215 guides the light beam L from the cylindrical lens 214 to the reflective surface 223a of the deflection scanning member 223 (polygon mirror).

The deflection scanner 220 includes a deflection scanning substrate 221, a deflection scanning motor 222 (polygon motor), and the deflection scanning member 223 [rotary polygon mirror (polygon mirror)]. The deflection scanning substrate 221 is fixed to the flat surface (upper surface) side of the lower lid 204 by a plurality of fixing members (screws) SC. The deflection scanning motor 222 is provided on the deflection scanning substrate 221. The deflection scanning member 223 is fixed to a rotary shaft 222a of the deflection scanning motor 222. The deflection scanning member 223 deflection-scans the light beam L from the light source reflecting mirror 215 in a predetermined main scanning direction X1.

The emission optical system 230 includes an fθ lens 231, a beam-detection reflecting mirror 232, a condensing lens 233 (beam detection lens), and a beam detector 234 (Beam Detection sensor (BD sensor)).

The fθ lens 231 has a shape that is long in the main scanning direction X1. The fθ lens 231 causes incidence of the light beam L that was deflection-scanned in the main scanning direction X1 (longitudinal direction W) by the deflection scanning member 223. The beam-detection reflecting mirror 232 guides, to the condensing lens 233, the light beam L deflection-scanned by the reflective surface 223a of the deflection scanning member 223. The beam detector 234 detects the main scanning start time (image writing start time) of the light beam L.

By the way, considering the detection accuracy of the beam detector 234, it is necessary to make a first optical path length from the deflection scanning member 223 to the scanning object (photoreceptor drum 3) equal to or substantially equal to a second optical path length from the deflection scanning member 223 to the beam detector 234, thereby to make the beam diameter of the light beam L irradiated at the photoreceptor drum 3 equal to or substantially equal to the beam diameter of the light beam L irradiated at the beam detector 234. However, in this example, the first optical path length is longer than the second optical path length. Therefore, the light beam L from the beam-detection reflecting mirror 232 is focused on the beam detector 234 by using the condensing lens 233. With this, even when the first optical path length is longer than the second optical path length, the beam diameter of the light beam L at the photoreceptor drum 3 and the beam diameter of the light beam L at the beam detector 234 can be made equal or substantially equal. Here, the condensing lens 233 can tolerate a certain degree of deviation of the optical axis of the light beam L.

The housing 201 has a bottom plate 201a with a rectangular shape and four side plates 201b to 201e surrounding the bottom plate 201a. The housing 201 is provided with a deflection scanning chamber 203 (see FIGS. 4 to 6) that covers the deflection scanner 220. An opening 203a (see FIG. 6) is provided in a portion corresponding to the deflection scanning chamber 203 of the bottom plate 201a. The opening 203a is closed by the lower lid 204. The lower lid 204 is fixed to the bottom surface (lower surface) side of the bottom plate 201a with a plurality of fixing members (screws) SC. The deflection scanner 220 is arranged on the lower lid 204, and the deflection scanner 220 is housed in the deflection scanning chamber 203 by fixing the lower lid 204 to the bottom plate 201a. With this, as will be described below, the deflection scanner 220 can be replaced by replacing the lower lid 204 provided with the deflection scanner 220 with the lower lid 204 provided with another deflection scanner 220.

The light beam L reflected by the light source reflecting mirror 215 is incident on the inside of the deflection scanning chamber 203 through a first window 203b (see FIG. 5) formed in the deflection scanning chamber 203. Further, the light beam L scanned by the deflection scanning member 223 is emitted to the outside of the deflection scanning chamber 203 through the first window 203b. A first dustproof glass plate 235 (transparent body) is provided in the first window 203b. With this, it is possible to effectively prevent any unnecessary substance such as dust from entering into the deflection scanning chamber 203. Further, the light beam L that has passed through the fθ lens 231 is emitted to the outside of the housing 201 through a second window 201f formed in the side plate 201e of the housing 201 on the side of the fθ lens 231. A second dustproof glass plate 236 (transparent body) is provided in the second window 201f. With this, it is possible to effectively prevent any unnecessary substance such as dust from entering into the housing 201.

The optical scanning device 200 further includes a substrate 240 (a substrate for the light source 211 and the beam detector 234). The light source 211 and the beam detector 234 are provided on the substrate 240. The substrate 240 is a flat, plate shaped, printed substrate that has a circuit for driving the light source 211. The substrate 240 is fixed to the outside of the side plate 201d on the side opposite to the fθ lens 231 of the housing 201 so that an emitter of the light source 211 and a light receiver of the beam detector 234 face the inside of the housing 201. The emitter of the light source 211 and the light receiver of the beam detector 234 face inside of the housing 201 through respective openings (not illustrated) formed in the side plate 201d. With this, the light source 211 can emit the light beam L from the emitter toward the collimator lens 212 in the housing 201. With the light receiver, the beam detector 234 can receive the light beam L from the condensing lens 233 in the housing 201.

Further, the deflection scanning substrate 221 is a flat, plate-shaped printed substrate that has a circuit for driving the deflection scanning motor 222. The deflection scanning motor 222 is fixed onto the deflection scanning substrate 221, and the central portion of the deflection scanning member 223 is connected and fixed to the rotary shaft 222a of the deflection scanning motor 222. The deflection scanning member 223 is rotationally driven by the deflection scanning motor 222.

Next, the optical path of the light beam L from the light source 211 to the entry into the photoreceptor drum 3 will be described.

The light beam L of the light source 211 is transmitted through the collimator lens 212, thus becomes substantially parallel light, is narrowed by the aperture member 213, is transmitted through the cylindrical lens 214, becomes incident on and then reflected by the light source reflecting mirror 215, and becomes incident on the reflective surface 223a of the deflection scanning member 223. The deflection scanning member 223 is rotated at a constant angular velocity in a predetermined rotation direction R by the deflection scanning motor 222, sequentially reflects the light beam L on each reflective surface 223a, and repeatedly deflects the light beam L in the main scanning direction X1 at a constant angular velocity. The fθ lens 231 condenses the light beam L so that the light beam L has a predetermined beam diameter on the surface of the photoreceptor drum 3 in either of the main scanning direction X1 and the sub-scanning direction. Further, the fθ lens 231 converts the light beam L, which is deflected at a constant angular velocity in the main scanning direction X1 by the deflection scanning member 223, so that the light beam L moves at a constant linear velocity on the photoreceptor drum 3. With this, the light beam L can repeatedly scan the surface of the photoreceptor drum 3 in the main scanning direction X1.

Further, with the beam detector 234, the optical scanning device 200 detects the main scanning start time of the light beam L emitted from the light source 211 and deflection-scanned in the main scanning direction X1 by the deflection scanning member 223. The beam detector 234 causes the light beam L, which is reflected by the beam-detection reflecting mirror 232, to be incident immediately before the main scanning (writing) of the photoreceptor drum 3 is started. The beam detector 234 receives the light beam L at the time immediately before the start of the main scanning of the surface of the photoreceptor drum 3, and outputs a BD signal indicating the time immediately before the start of the main scanning. The main scanning start time of the photoreceptor drum 3 on which the toner image in formed is set according to the BD signal, and the writing of the light beam L according to the image data is started. Then, the two-dimensional surface (peripheral surface) of the photoreceptor drum 3 driven rotationally and charged is scanned by the light beam L, and each electrostatic latent image is formed on the surface of the photoreceptor drum 3.

By the way, the closer the incident angle of the light beam L incident on the first dustproof glass plate 235 is to a right angle, the more the light transmission can improve accordingly. In this regard, since the light beam L is scanned in the main scanning direction X1, when the first dustproof glass plate 235 is provided along the longitudinal direction W of the fθ lens 231, for example, the following inconveniences occur. That is, the light beam L (light beam L directed from the deflection scanning member 223 to the beam detector 234) outside a scanning area α (see FIG. 8), which is from the scanning start position to the scanning end position of the light beam L by the deflection scanning member 223 in the first dustproof glass plate 235, is too far inclined with respect to the first dustproof glass plate 235, and so the light transmission deteriorates.

In this respect, in the present embodiment, the first dustproof glass plate 235 is inclined so as to face the beam detector 234 side with respect to the longitudinal direction W of the fθ lens 231. In this way, not only is it possible to avoid deterioration of the light transmission of the light beam L in the scanning area a with respect to the first dustproof glass plate 235, but it is also possible to avoid deterioration of light transmission of the light beam L from the deflection scanning member 223 toward the beam detector 234 with respect to the first dustproof glass plate 235. Further, the deflection scanning substrate 221 is arranged in parallel to or substantially parallel to the first dustproof glass plate 235.

About the Present Embodiment

The optical scanning device 200 according to the present embodiment includes an optical member that refracts the light beam L to diverge or focus the light beam L. Examples of the material that can be used for the optical member include a glass material and a transparent resin material, for example, but not limited to, acrylic resin and polycarbonate. In this example, the optical member is the condensing lens 233 that refracts and focuses the light beam L.

First Embodiment

Figure 9A:
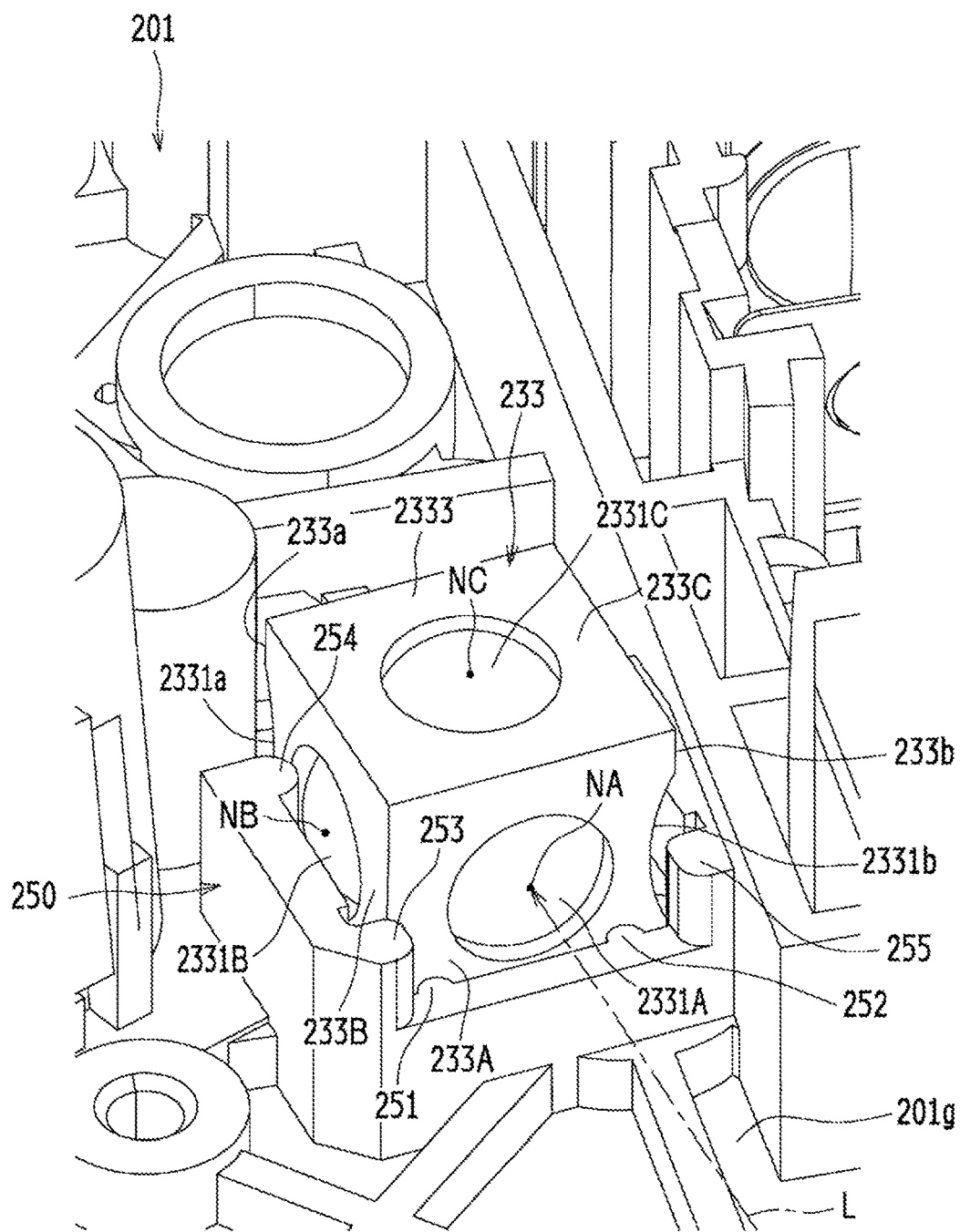
FIG. 9A is a perspective view of an optical member according to a first embodiment mounted to a supporter in a housing as viewed from above on the incident side of a light beam.
Figure 9B:
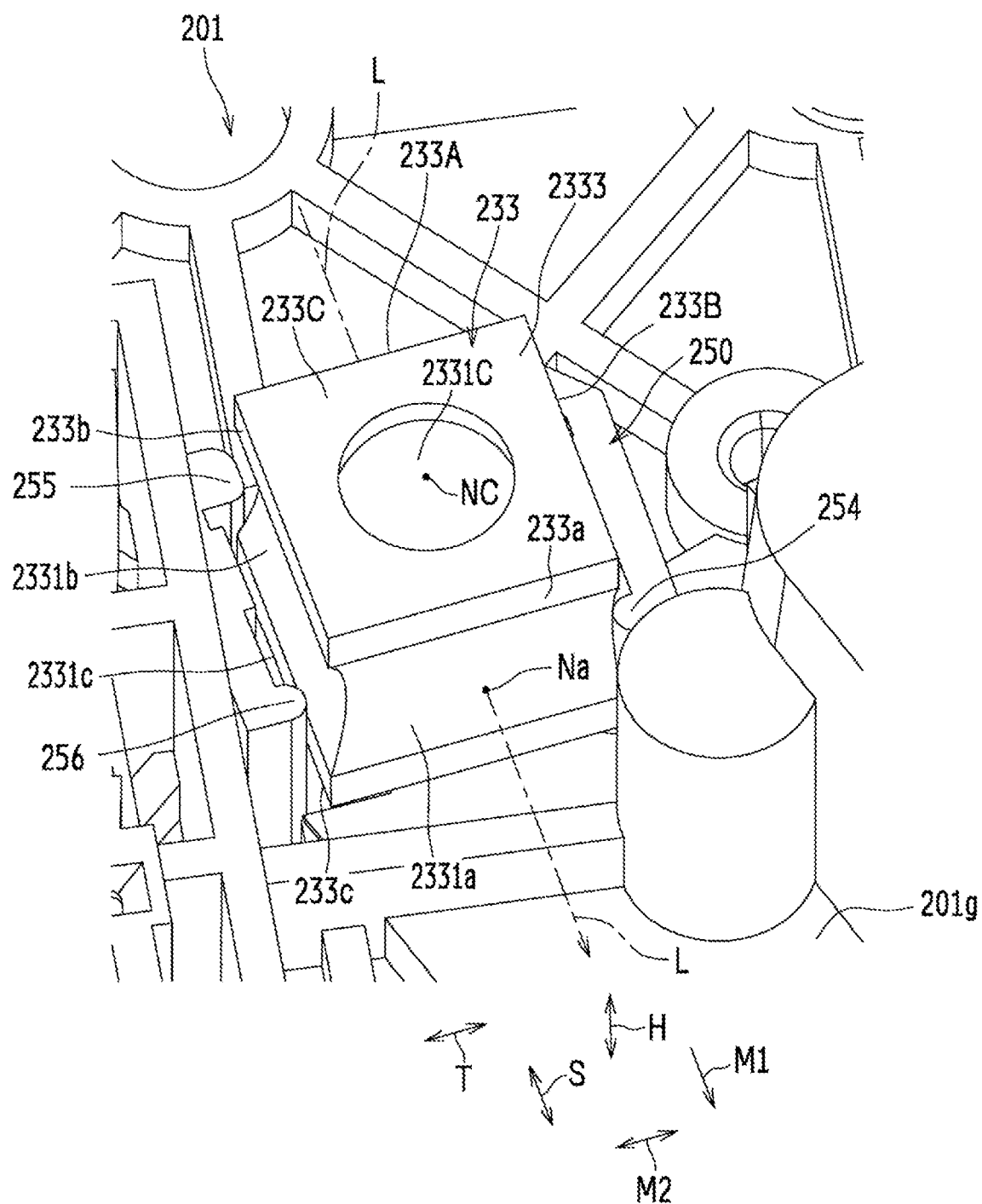
FIG. 9B is a perspective view of the optical member according to the first embodiment mounted to the supporter in the housing as viewed from above on the emission side of the light beam.
Figure 9C:
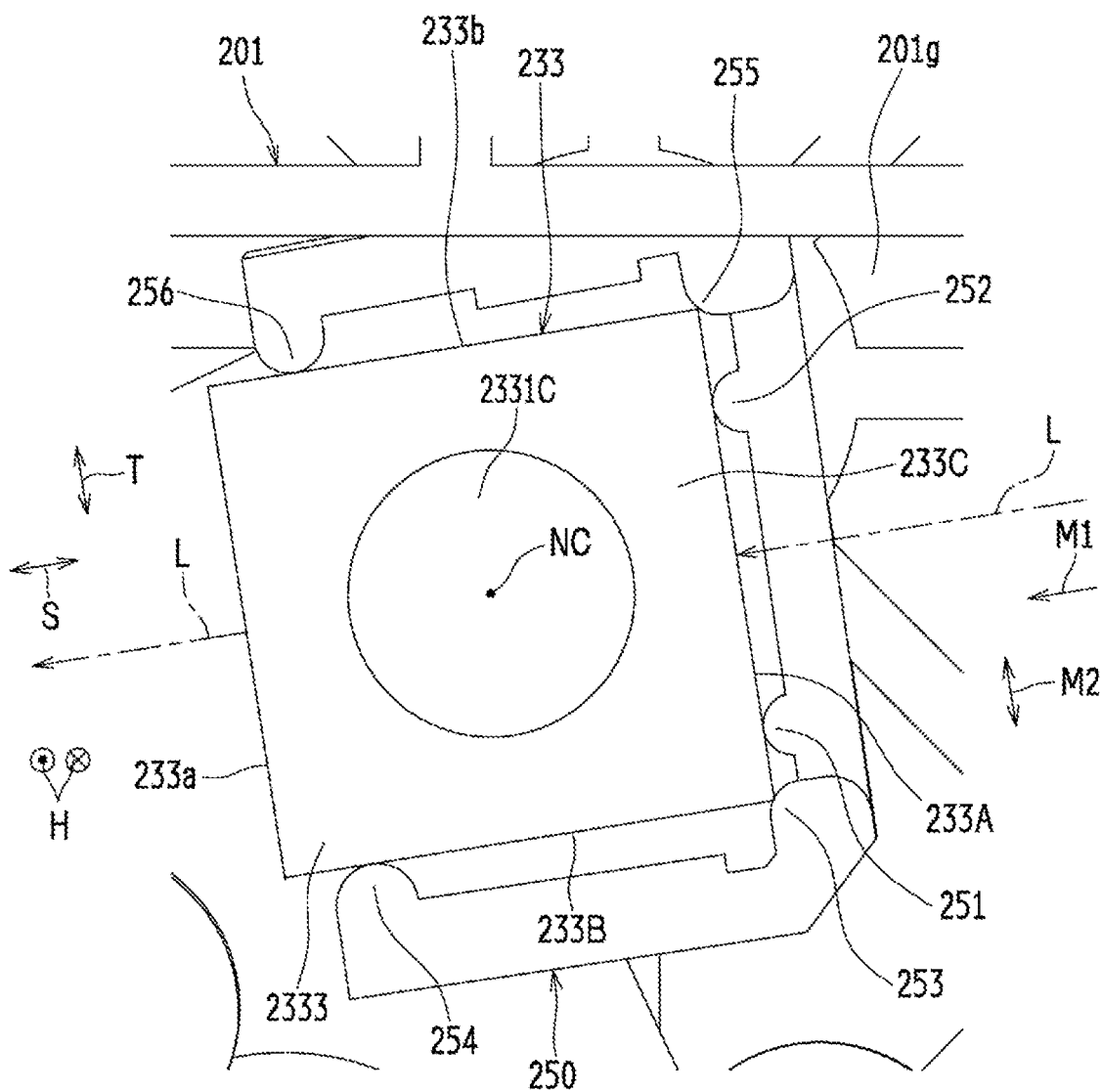
FIG. 9C is a plan view of the optical member illustrated in FIGS. 9A and 9B.
Figure 10A:
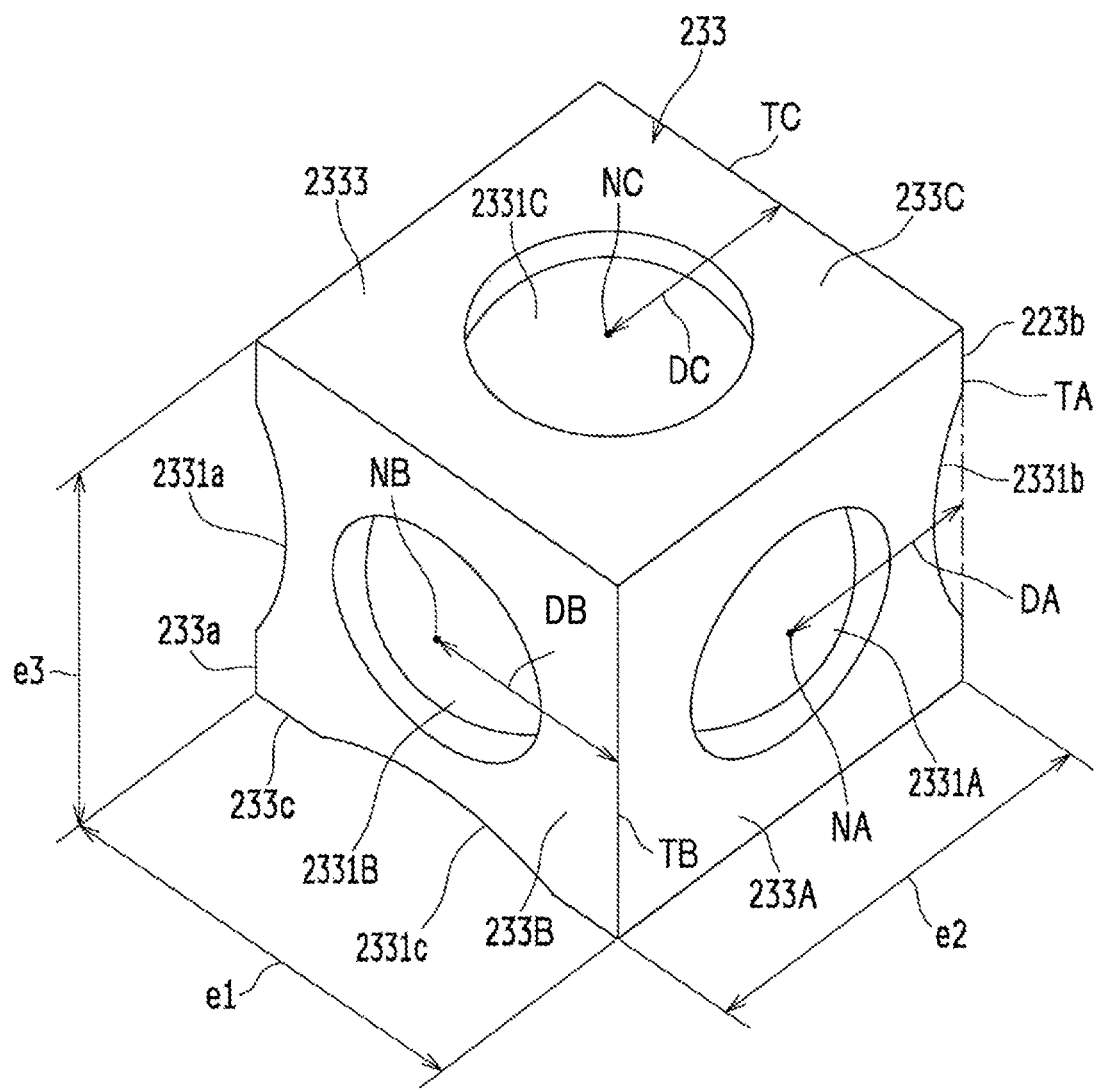
FIG. 10A is a perspective view of the optical member according to the first embodiment as viewed from one side surfaces.
Figure 10B:
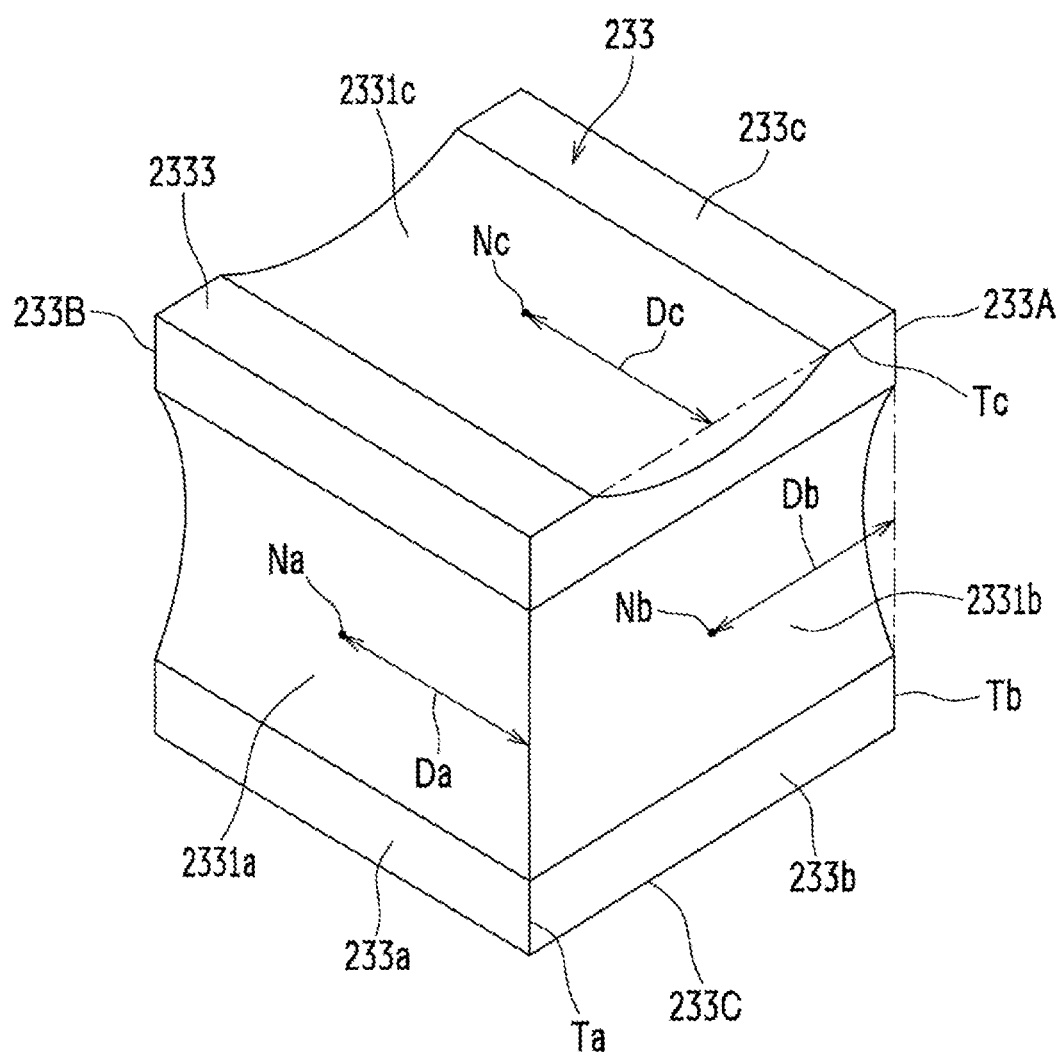
FIG. 10B is a perspective view of the optical member according to the first embodiment as viewed from the other side surfaces.
Figure 11A:
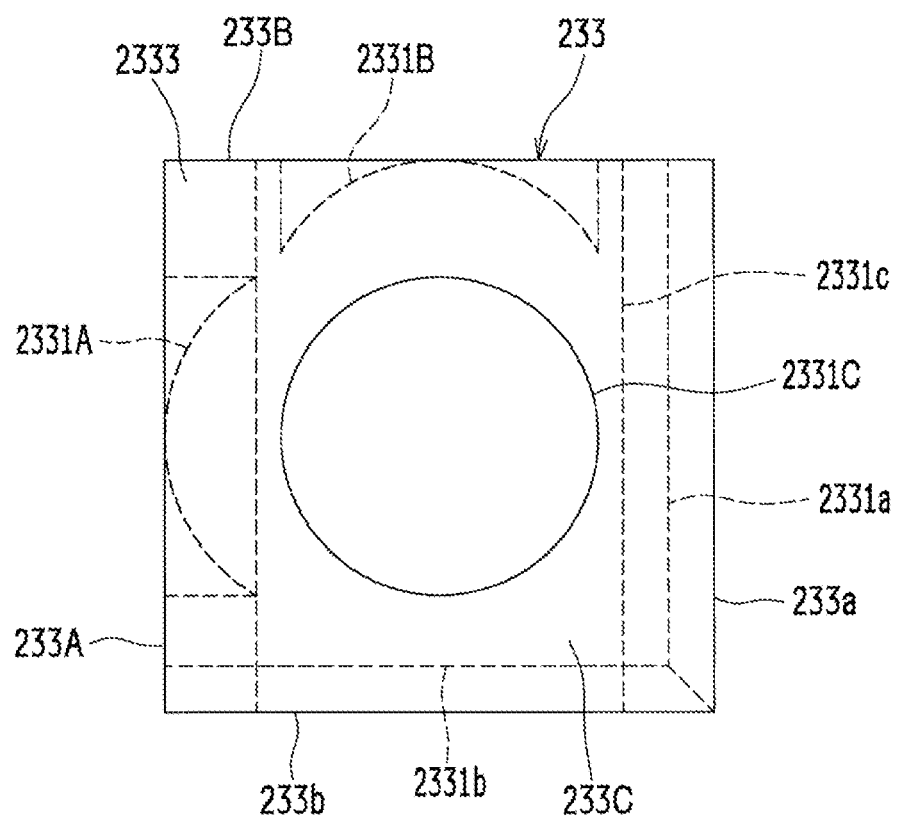
FIG. 11A is a plan view of the optical member according to the first embodiment.
Figure 11B:
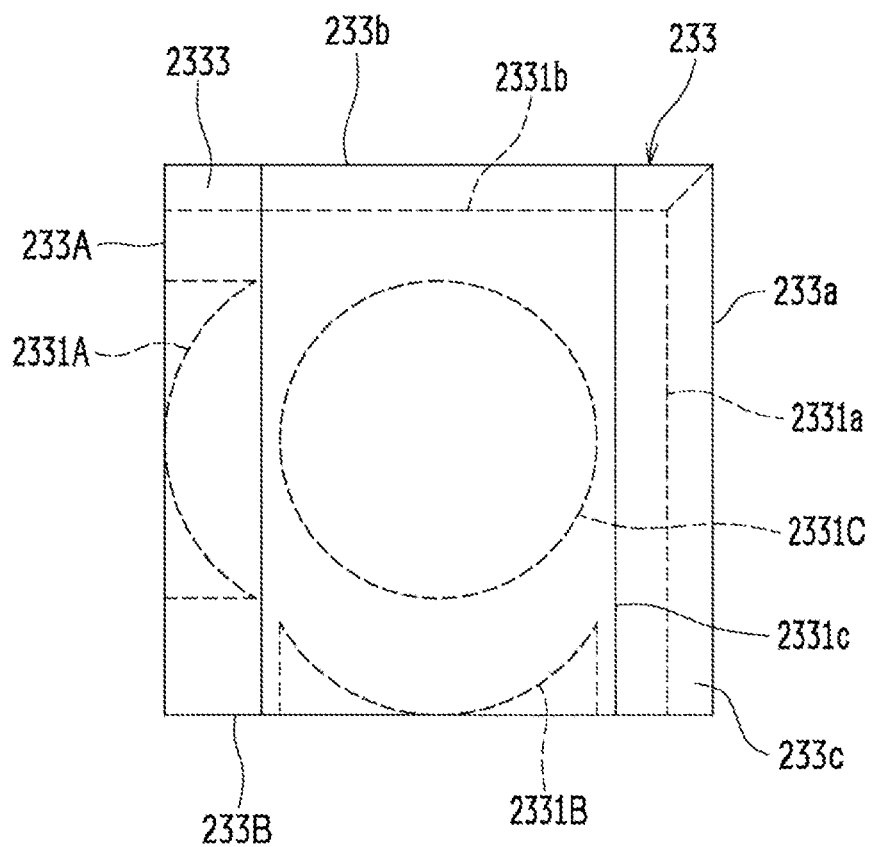
FIG. 11B is a bottom view of the optical member according to the first embodiment.
Figure 11C:
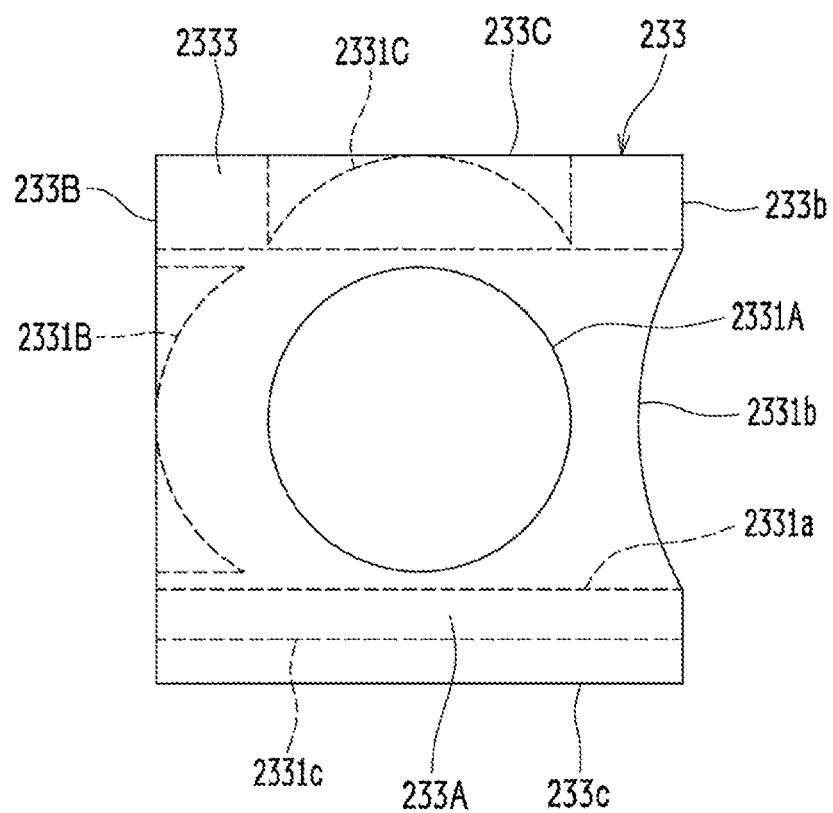
FIG. 11C is a left side view of the optical member according to the first embodiment.
Figure 11D:
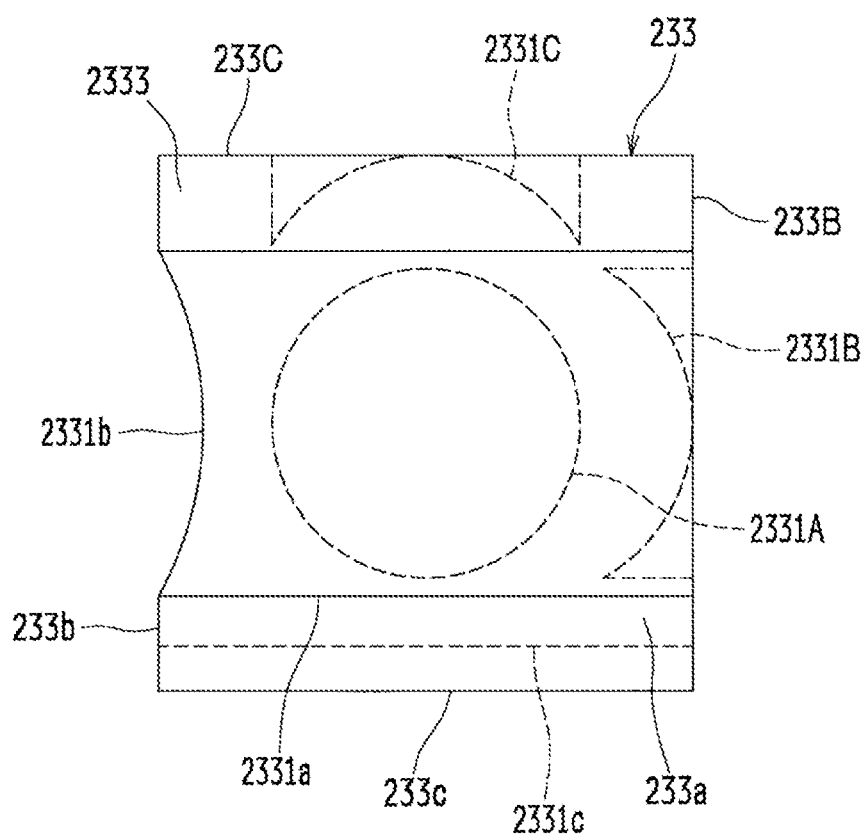
FIG. 11D is a right side view of the optical member according to the first embodiment.
Figure 11E:
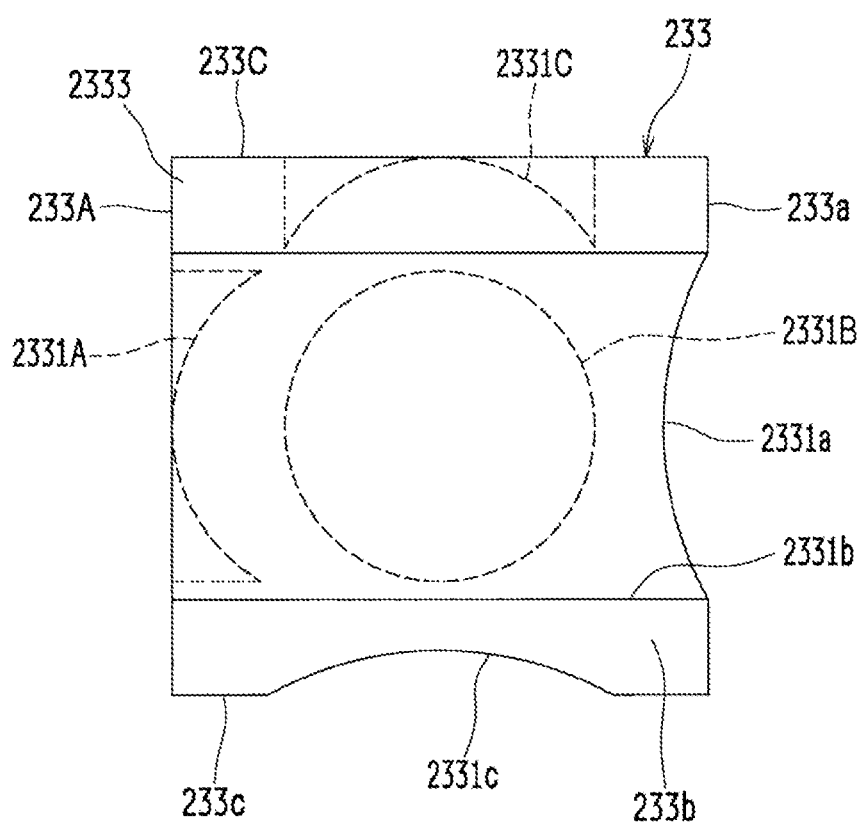
FIG. 11E is a front view of the optical member according to the first embodiment.
Figure 11F:
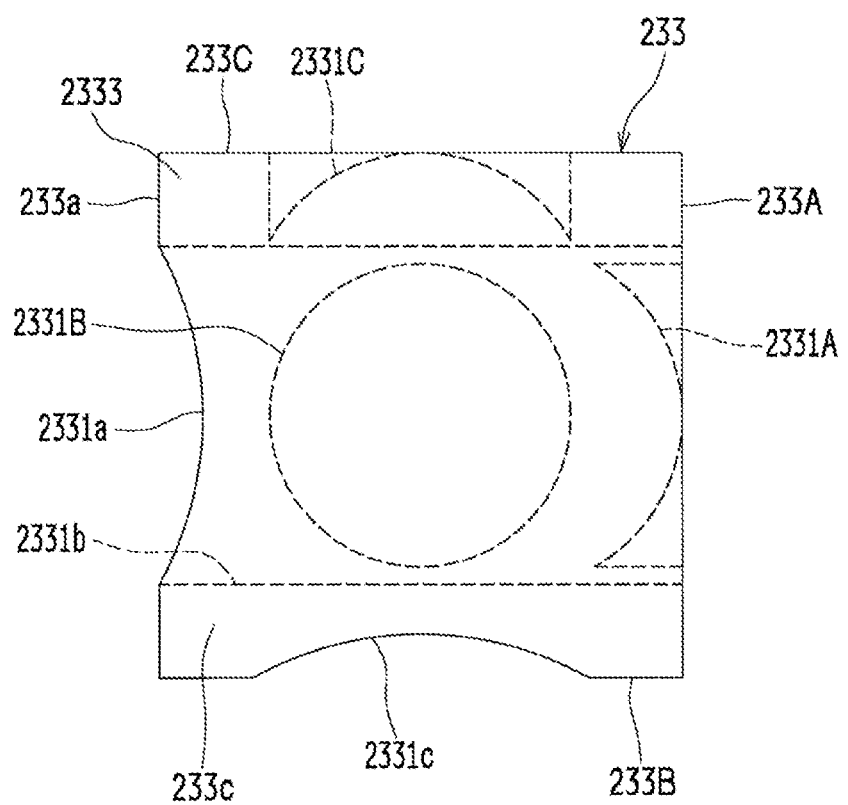
FIG. 11F is a rear view of the optical member according to the first embodiment.

FIG. 9A and FIG. 9B are perspective views of the state in which the optical member (233) according to a first embodiment is mounted on a supporter 250 in the housing 201 as viewed, respectively, from above on the incident side and the emission side of the light beam L. FIG. 9C is a plan view of the optical member (233) illustrated in FIG. 9A and FIG. 9B. FIG. 10A and FIG. 10B are, respectively, perspective views of the optical member (233) according to the first embodiment as viewed from one side surfaces 233A, 233B, 233C and the other side surfaces 233a, 233b, 233c. FIG. 11A to FIG. 11F are six views of the optical member (233) according to the first embodiment.

The optical member (233) includes at least three pairs of opposing surfaces (233A, 233a), (233B, 233b), (233C, 233c).

Each of the three pairs of surfaces (233A, 233a), (233B, 233b), (233C, 233c) include a lens (2331A, 2331a), (2331B, 2331b), (2331C, 2331c).

Then, according to the first embodiment, as illustrated in FIG. 10A, in the optical member (233), the curvatures (lens shapes) of the lenses 2331A, 2331B, 2331C at the one side surfaces 233A, 233B, 233C of respective three pairs of surfaces (233A, 233a), (233B, 233b), (233C, 233c) are all the same. In this example, the lenses 2331A, 2331B, 2331C on one side surfaces 233A, 233B, 233C are all spherical lenses. Specifically, the curvatures of the lenses 2331A, 2331B, 2331C are all 0.0446 [1/mm] (curvature radius 22.4 [mm]). The lenses 2331A, 2331B, 2331C may be aspherical lenses. In this case, the curvature can be, for example, a curvature based on the position of the optical axis.

In the first embodiment, in the optical member (233), for example, as illustrated in FIG. 9A to FIG. 9C, the incident side of the light beam L may be the lens 2331A on the one side surface 233A, and the emission side of the light beam L may be the lens 2331a on the other side surface 233a.

Further, in the optical member (233), for example, although not shown, the incident side of the light beam L may be the lens 2331B on the one side surface 233B or the lens 2331C on the one side surface 233C, and the emission side of the light beam L may be the lens 2331b on the other side surface 233b or the lens 2331c on the other side surface 233c.

Thus, according to the first embodiment, the optical member (233) only includes at least three pairs of opposing surfaces (233A, 233a), (233B, 233b), (233C, 233c), and therefore has a simple configuration. Moreover, since only the work of arranging the optical member (233) is performed, any adjustment work does not have to be particularly performed. Then, by directing any one of the lenses 2331A, 2331B, 2331B of the plurality of one side surfaces 233A, 233B, 233C to the incident side of the light beam L, the corresponding lens of the lenses 2331a, 2331b, 2331c at the other side surfaces 233a, 233b, 233c can be directed to the emission side of the light beam L. Therefore, the optical member can be shared by various models of image forming devices or optical scanning devices.

In this example, in the optical member (233), as illustrated in FIG. 10A, the curvatures (lens shapes) of the lenses 2331A, 2331B, 2331C at the one side surfaces 233A, 233B, 233C of the respective three pairs of surfaces (233A, 233a), (233B, 233b), (233C, 233c) are all the same, but are different in lens shape from the lenses 2331a, 2331b, 2331c (see FIG. 10B) at the other side surfaces 233a, 233b, 233c. In this example, the other side lenses 2331a, 2331b, 2331c all have the same lens shape and are toroidal surface-shaped lenses. The toroidal surface is a surface having a curvature in one direction (width direction T in this example) but not in a direction orthogonal to it (height direction H in this example). Here, the width direction T is a direction orthogonal to both the height direction H, which is a direction on the installation side to the housing 201 and a direction opposite to the installation side, and an optical axis direction S. In the optical member (233), all the curvatures of the lenses 2331a, 2331b, 2331c at the other side surfaces 233a, 233b, 233c are all the same. Specifically, the curvatures of the lenses 2331a, 2331b, 2331c are all 0.0190 [1/mm] (curvature radius 52.6 [mm]).

By doing so, the light beam L can be focused in one direction (width direction T in this example).

According to the present embodiment, in the optical member (233), at least one lens of lenses (2331A, 2331a), (2331B, 2331b), (2331C, 2331c) at the three pairs of surfaces (233A, 233a), (233B, 233b), (233C, 233c) is a convex lens. In this example, the lenses 2331A, 2331B, 2331C at the one side surfaces 233A, 233B, 233C are all convex lenses. Further, the convex lenses (2331A, 2331B, 2331C) do not protrude from the surfaces (233A, 233B, 233C) at which the convex lenses (2331A, 2331B, 2331C) are provided. Specifically, the convex lens (2331A, 2331B, 2331C) has a top portion flush with the surface (233A, 233B, 233C) or is provided inside the surface (233A, 233B, 233C).

By doing so, the surface (233A, 233B, 233C) of the convex lens (2331A, 2331B, 2331C) is not obstructed by the convex lens (2331A, 2331B, 2331C), and can reliably contact the installation surface (in this example, a bottom surface 201g of the housing 201). With this, the optical member (233) can be reliably provided in the housing 201 while realizing the compactification of the optical member (233).

Specifically, the optical member (233) includes an outer frame 2333 (outer shape) provided on the outer periphery of the lenses (2331A, 2331a), (2331B, 2331b), (2331C, 2331c).

In the present embodiment, the three pairs of surfaces (233A, 233a), (233B, 233b), (233C, 233c) form a cube.

By doing so, the optical member (233) can be made compact, and the optical scanning device 200 can be made compact.

Specifically, the outer frame 2333 of the optical member (233) has a cubic shape. Specifically, dimensions e1, e2, and e3 (see FIG. 10A) of the sides in the optical axis direction S, the width direction T, and the height direction H, which are the dimensions of the outer frame 2333, are all 12 mm.

As illustrated in FIGS. 5 and 9A to 9C, the housing 201 is provided with a supporter 250 for supporting the optical member (233). The supporter 250 has a plurality of positioners 251 to 256 that make positioning in the optical axis direction S [incident direction M1 of the light beam L to the optical member (233)] and the width direction T (orthogonal direction M2 orthogonal to the incident direction M1).

By doing so, the optical member (233) can be reliably fixed in a state of being positioned in the same position of the housing 201 [a common position regardless of which surface of the optical member (233) the optical member (233) is installed].

Specifically, the supporter 250 supports the optical member (233) in a state where the to-be-installed surface among the surfaces of the optical member (233) is in contact with the installation surface (in this example, the bottom surface 201g of the housing 201). The plurality of positioners 251 to 256 define the position in the optical axis direction S (in this example, the direction opposite to the incident direction M1) and the width direction T.

In the present embodiment, respective shortest distances DA, DB, DC (see FIG. 10A) between optical axes NA, NB, NC (center of curvature) of the lenses 2331A, 2331B, 2331C at the one side surfaces 233A, 233B, 233C of the respective three pairs of surfaces (233A, 233a), (233B, 233b), (233C, 233c), and reference sides TA, TB, TC which are each any one of respective sides surrounding the lenses 2331A, 2331B, 2331C are all the same. Further, shortest distances Da, Db, Dc (see FIG. 10B) between optical axes Na, Nb, Nc (center of curvature) of the lenses 2331a, 2331b, 2331c at the other side surfaces 233a, 233b, 233c, and reference sides Ta, Tb, Tc which are each any one of respective sides surrounding the lenses 2331a, 2331b, 2331c are all the same.

In this example, the reference sides TA, TB, TC are each one side in the width direction T when the to-be-installed surface among the surfaces of the optical member (233) is installed in the housing 201. Specifically, the shortest distances (DA, DB, DC) and (Da, Db, Dc) are all 6 mm.

By doing so, when the to-be-installed surface among the surfaces of the optical member (233) is installed in the housing 201, the distances between the optical axes NA, NB, NC and the reference sides TA, TB, TC can be the same. With this, the above configuration can be preferably used when the incident positions of the light beams L are equal in various models of optical scanning devices.

Further, in the present embodiment, the shortest distances (DA, DB, DC) may be different from each other, and the shortest distances (Da, Db, Dc) may be different from each other. For example, the shortest distances (DA, DB, DC) can be set to 6 mm, 5 mm, 4 mm respectively, and the shortest distances (Da, Db, Dc) can be set to 6 mm, 5 mm, 4 mm respectively.

By doing so, when the to-be-installed surface among the surfaces of the optical member (233) is installed in the housing 201, the distances between the optical axes NA, NB, NC and the reference sides TA, TB, TC can be made different from each other. The above configuration can be preferably used when the incident positions of the light beams L are different from each other in various models of optical scanning devices.

Further, in the present embodiment, the optical member (233) is used as a condensing lens.

By doing so, the optical member (233) can function as, for example, the condensing lens that condenses the light beam L from the deflection scanning member 223 toward the beam detector 234.

Second Embodiment

Figure 12A:
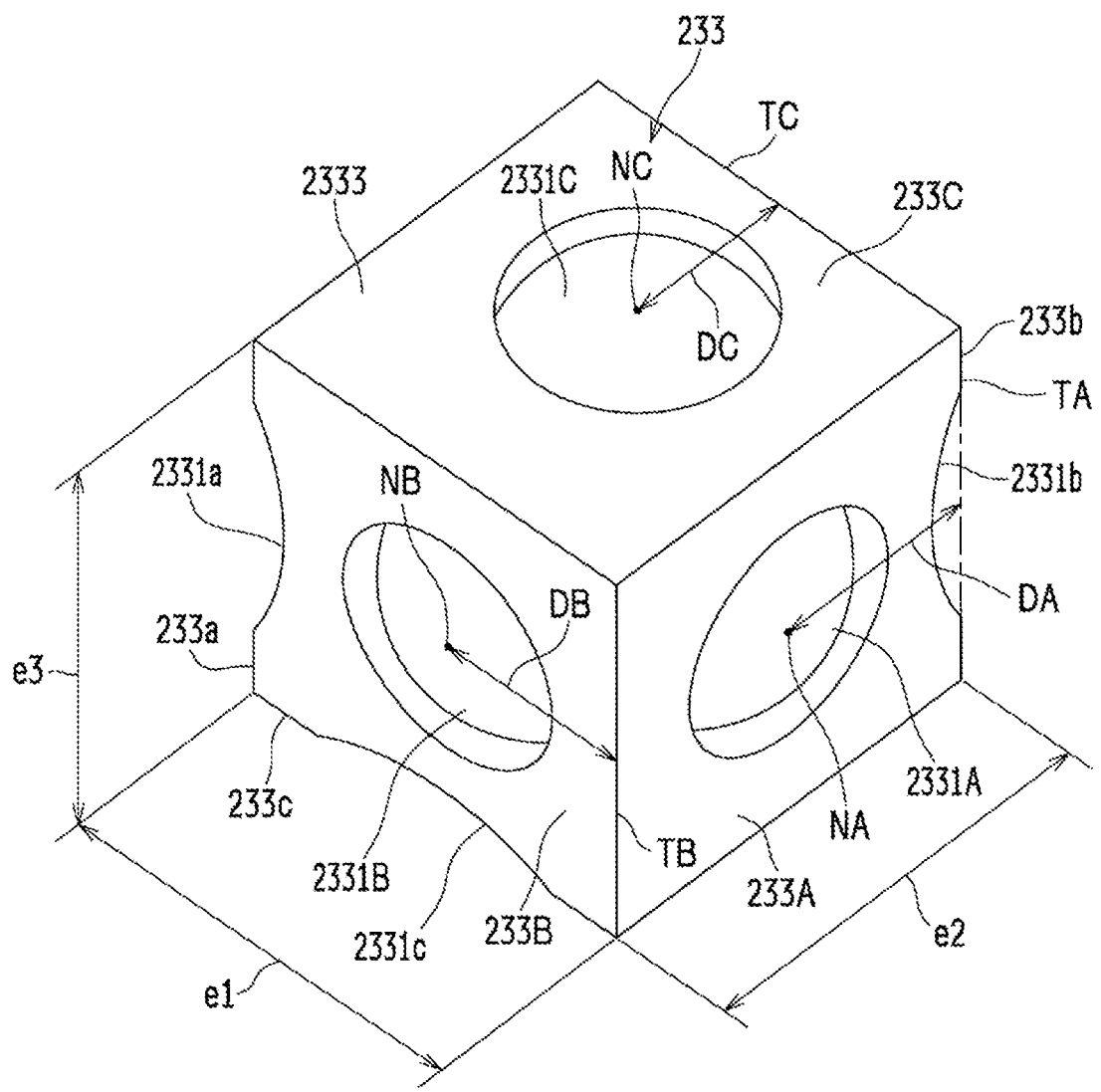
FIG. 12A is a perspective view of the optical member according to a second embodiment as viewed from the one side surfaces.
Figure 12B:
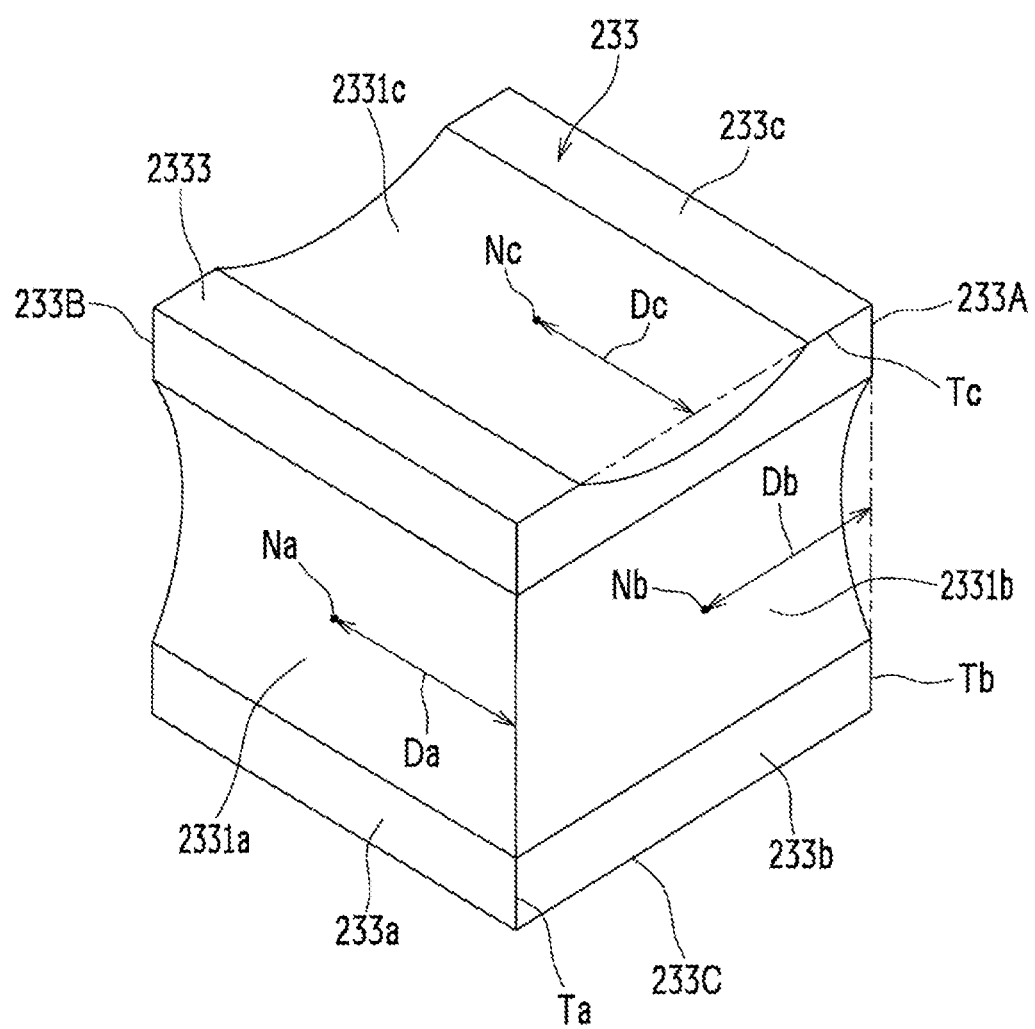
FIG. 12B is a perspective view of the optical member according to the second embodiment as viewed from the other side surface.

FIG. 12A and FIG. 12B are perspective views of the optical member (233) according to a second embodiment as viewed from the one side surfaces 233A, 233B, 233C and the other side surfaces 233a, 233b, 233c, respectively.

From the optical scanning device 200 according to the first embodiment, the optical scanning device 200 according to the second embodiment is different in that the curvatures of the lenses 2331A, 2331B, 2331C at the one side surfaces 233A, 233B, 233C of respective pairs of at least two pairs (three pairs in this example) of the three pairs of surfaces (233A, 233a), (233B, 233b), (233C, 233c) are different from each other. In this example, the curvatures of the lenses 2331a, 2331b, 2331c at the other side surfaces 233a, 233b, 233c are different from each other. Specifically, the curvatures of the lenses 2331A, 2331B, 2331C are, respectively, 0.0446 [1/mm] (curvature radius 22.4 [mm]), 0.0394 [1/mm] (curvature radius 25.4 [mm]), 0.0515 [1/mm] (curvature radius 19.4 [mm]). Further, the curvatures of the lenses 2331a, 2331b, 2331c are, respectively, 0.0190 [1/mm] (curvature radius 52.6 [mm]), 0.0202 [1/mm] (curvature radius 49.6 [mm]), 0.01799 [1/mm] (curvature radius 55.6 [mm]). Further, the curvatures of the lenses 2331A, 2331B, 2331C may be different from each other, while the curvatures of the lenses 2331A, 2331B, 2331C may be all the same.

By doing so, the focal lengths of the lenses 2331A, 2331B, 2331C can be made different from each other.

Moreover, in the optical member (233) according to the second embodiment, the respective shortest distances DA, DB, DC (see FIG. 12A) between the optical axes NA, NB, NC of the lenses 2331A, 2331B, 2331C at the one side surfaces 233A, 233B, 233C of respective pairs of at least two pairs of surfaces (233A, 233a), (233B, 233b), (233C, 233c), and the reference sides TA, TB, TC which are each any one of the respective sides surrounding the surfaces including the lenses 2331A, 2331B, 2331C are different from each other. Further, the shortest distances Da, Db, Dc (see FIG. 12B) between the optical axes Na, Nb, Nc of the lenses 2331a, 2331b, 2331c at the other side surfaces 233a, 233b, 233c, and the reference sides TA, TB, TC which are each any one of the respective sides surrounding the lenses 2331a, 2331b, 2331c are different from each other. Specifically, the shortest distances (DA, DB, DC) are 6 mm, 5 mm, 4 mm respectively, and the shortest distances (Da, Db, Dc) are 6 mm, 5 mm, 4 mm respectively.

By doing so, when the to-be-installed surface among the surfaces of the optical member (233) is installed in the housing 201, the distances between the optical axes NA, NB, NC and the reference sides TA, TB, TC can be made different from each other. With this, the above configuration can be preferably used when the incident positions of the light beams L are different from each other in various models of optical scanning devices.

Next, a configuration example in which the curvatures of the lenses 2331A, 2331B, 2331C are different from each other will be described below with reference to FIG. 8, FIG. 13A, FIG. 13B, and FIG. 14.

Figure 13A:
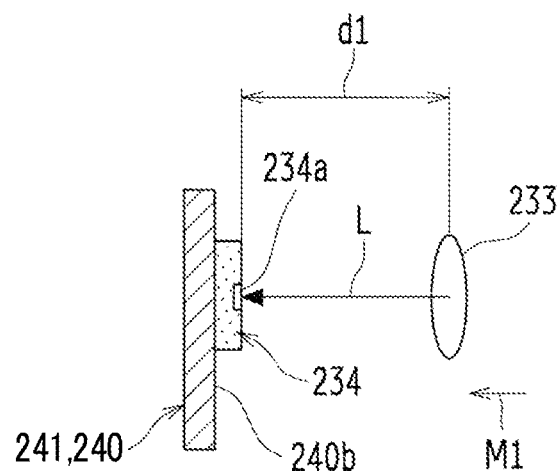
FIG. 13A is a schematic view for explaining a back surface light receiving type beam detection structure.
Figure 13B:
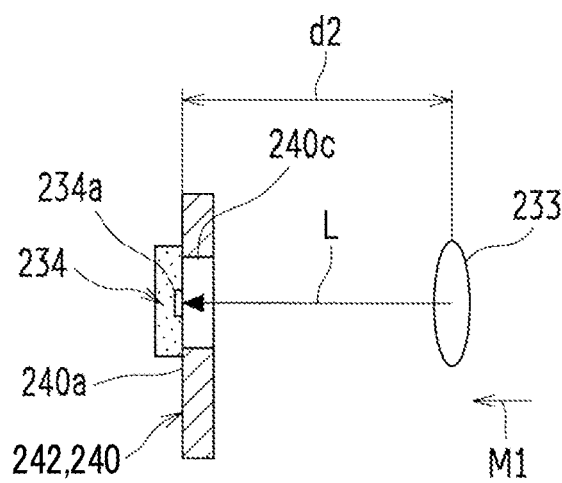
FIG. 13B is a schematic view for explaining a front surface receiving type beam detection structure.
Figure 14:
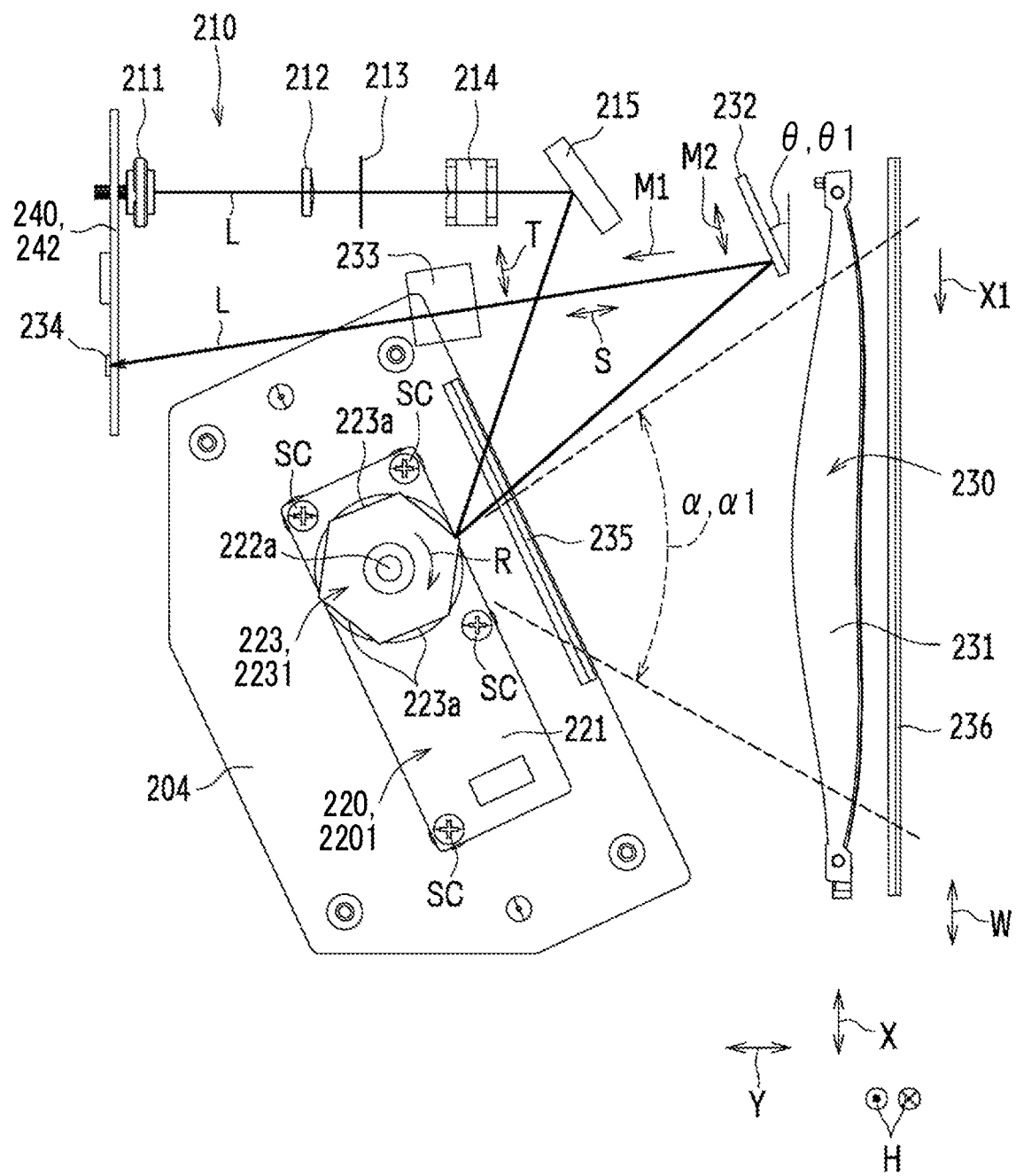
FIG. 14 is a plan view illustrating another example of the configuration of the optical system of the normal size (A3 size) specification of the recording paper in the optical scanning device.

FIG. 13A is a schematic view for explaining a back surface light receiving type beam detection structure, and FIG. 13B is a schematic view for explaining a front surface light receiving type beam detection structure. FIG. 14 is a plan view illustrating another example of the configuration of the optical system of the normal size (A3 size) specification of the recording paper (paper P) in the optical scanning device 200.

By the way, depending on the type of the beam detector 234, the incident position in the optical axis direction S (incident direction M1 in which the light beam L is incident) which is the direction of an optical axis N may be different. For example, the beam detector 234 has the front surface light receiving type beam detection structure and the back surface light receiving type beam detection structure. In the present embodiment, it is possible to mount a plurality of types of beam detectors 234 having incident positions different from each other in the incident direction M1 in which the light beam L is incident.

The optical scanning device 200 is equipped with a back surface light receiving substrate 241 (double-sided substrate or multilayer substrate) or a front surface light receiving substrate 242 (single-sided substrate) as the substrate 240, depending on the model of the image forming device 100.

The back surface light receiving substrate 241 (substrate 240) has conductor patterns formed on both sides (front surface and back surface). As illustrated in FIG. 13A, the beam detector 234 provided on the back surface light receiving substrate 241 (substrate 240) may be, for example, mounted on a back surface 240b so that a light receiver 234a faces the side opposite to the back surface 240b of the back surface light receiving substrate 241 [double-sided substrate or multilayer substrate (four-layer plate)]. Further, the front surface light receiving substrate 242 (substrate 240) has a conductor pattern formed only on one surface (surface). As illustrated in FIG. 13B, the beam detector 234 provided on the front surface light receiving substrate 242 (substrate 240) may be, for example, mounted on a front surface 240a of the front surface light receiving substrate 242 (single-sided substrate) so that a light receiver 234a (light receiving surface) faces a through hole 240c provided in the front surface light receiving substrate 242 (single-sided substrate). In this case, when the back surface light receiving substrate 241 (double-sided substrate or multilayer substrate) and the front surface light receiving substrate 242 (single-sided substrate) are mounted in the same position in the incident direction M1, the beam detector 234 provided on the back surface light receiving substrate 241 and the beam detector 234 provided on the front surface light receiving substrate 242 are different in position of the light receiver 234a in the incident direction M1. Due to this, a focal length d1 of the light beam L to the light receiver 234a of the beam detector 234 by the optical member (233) in the back surface light receiving type beam detection structure illustrated in FIG. 13A and a focal length d2 of the light beam L to the light receiver 234a of the beam detector 234 by the optical member (233) in the front surface light receiving type beam detection structure illustrated in FIG. 13B are different (d1<d2). Then, aligning the focal position of the optical member (233) with the focal length d1 or the focal length d2 to the beam detector 234 in any one of the back surface light receiving type beam detection structure and the front surface light receiving type beam detection structure will misalign the focal position of the optical member (233) in the any other of the beam detection structure, thus deteriorating the beam detection accuracy of the beam detector 234.

In this respect, in the optical scanning device 200 according to the present embodiment, since the curvatures of the lenses 2331A, 2331B, 2331C are different from each other, the focal lengths of the lenses 2331A, 2331B, 2331C can be made different from each other. That is, the focal length d1 illustrated in FIG. 13A and the focal length d2 illustrated in FIG. 13B can be made different, thereby making it possible to effectively prevent deterioration of the beam detection accuracy of the beam detection structure.

Next, a configuration example in which the shortest distances (DA, DB, DC) and (Da, Db, Dc) are different from each other will be described below with reference to FIG. 7, FIG. 8, and FIG. 14 to FIG. 18.

Figure 15:
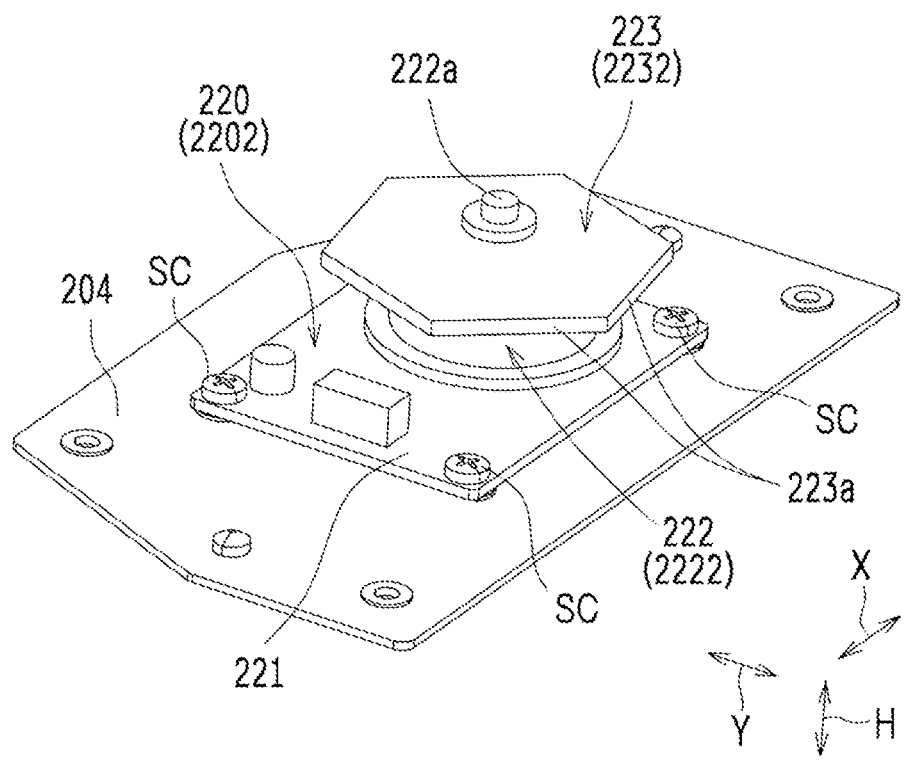
FIG. 15 is a perspective view illustrating another example of the deflection scanner in the optical scanning device.
Figure 16:
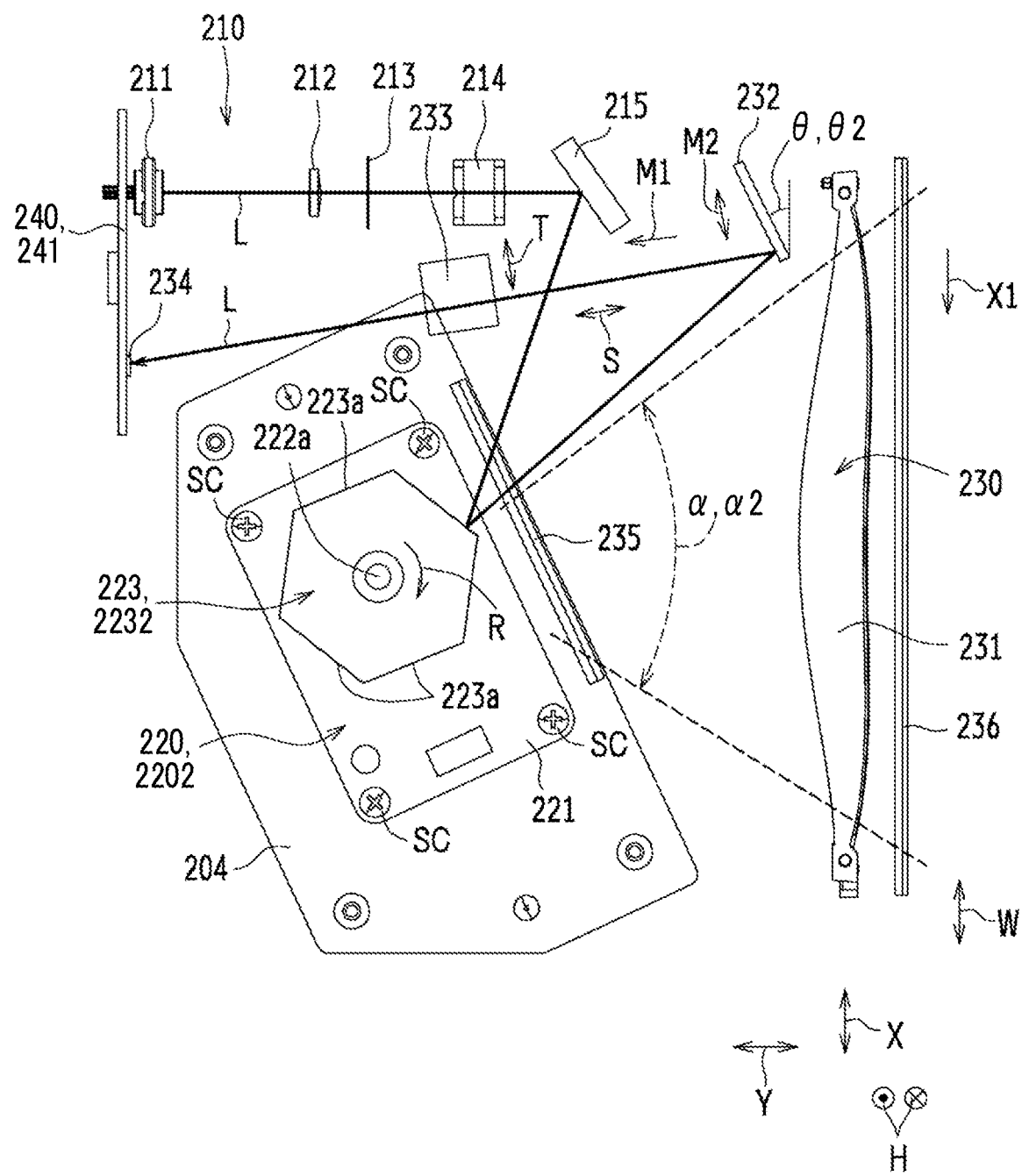
FIG. 16 is a plan view illustrating an example of the configuration of the optical system having a special size (SRA3 size) specification of the recording paper in the optical scanning device.
Figure 17:
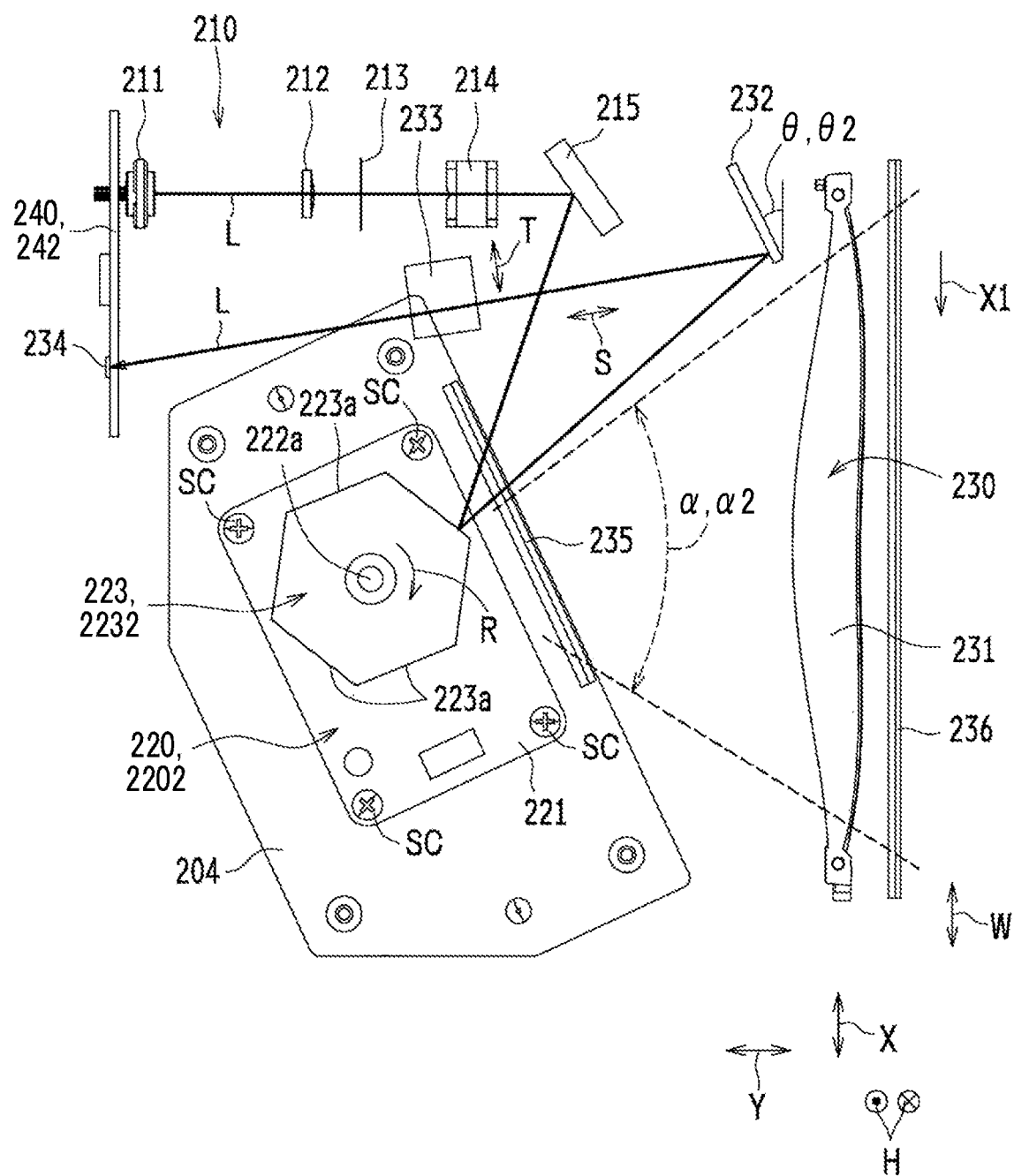
FIG. 17 is a plan view illustrating another example of the configuration of the optical system having the special size (SRA3 size) specification of the recording paper in the optical scanning device.

FIG. 15 is a perspective view illustrating another example of the deflection scanner 220 in the optical scanning device 200. FIG. 16 and FIG. 17 are plan views illustrating, respectively, an example and another example of the configuration of the optical system of a special size (SRA3 size) specification of the recording paper (paper P) in the optical scanning device 200. Further, FIG. 18 is a plan view illustrating, as one figure, the configuration of the optical system in the optical scanning device 200 illustrated in FIG. 8, FIG. 14, FIG. 16 and, FIG. 17.

The deflection scanning motor 222 (first deflection scanning motor 2221, second deflection scanning motor 2222) is provided on the deflection scanning substrate 221. The deflection scanning member 223 (first deflection scanning member 2231, second deflection scanning member 2232) is fixed to the rotary shaft 222a of the deflection scanning motor 222 (2221, 2222). The deflection scanning member 223 (2231, 2232) deflect-scans the light beam L from the light source reflecting mirror 215 in the predetermined main scanning direction X1.

Figure 18:
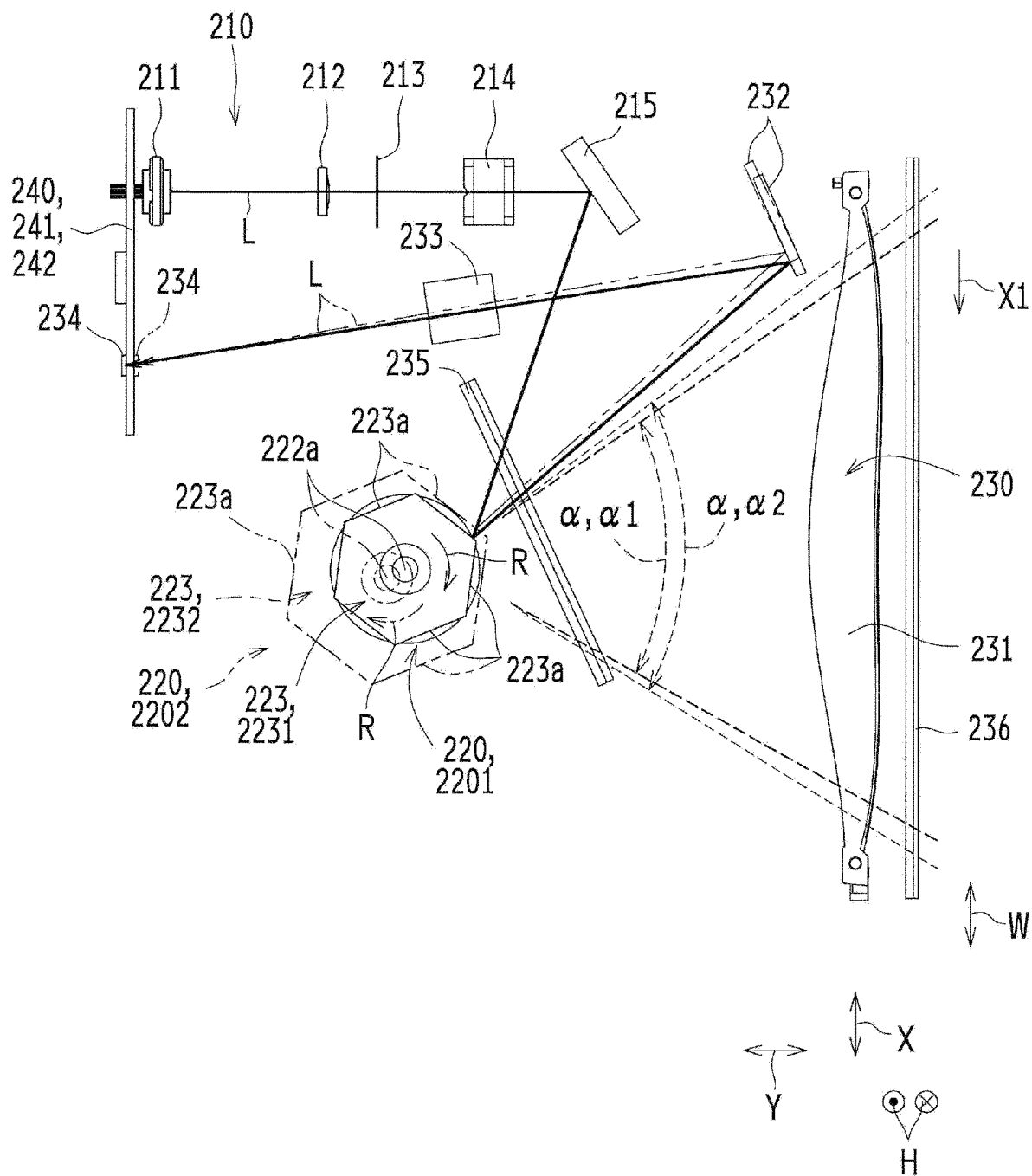
FIG. 18 is a plan view illustrating, as one figure, the configuration of the optical system in the optical scanning device illustrated in FIG. 8, FIG. 14, FIG. 16, and FIG. 17.

In the optical scanning device 200, the size, in the main scanning direction X1, of the reflective surface 223a of the deflection scanning member 223 (second deflection scanning member 2232) of the deflection scanner 220 (2202) illustrated in FIG. 15 to FIG. 18 is larger than the size, in the main scanning direction X1, of the reflective surface 223a of the deflection scanning member 223 (first deflection scanning member 2231) of the deflection scanner 220 (2201) illustrated in FIG. 7, FIG. 8, FIG. 14 and, FIG. 18. In the optical scanning device 200, between the deflection scanner 220 (2201) illustrated in FIG. 7, FIG. 8, FIG. 14 and, FIG. 18 and the deflection scanner 220 (2202) illustrated in FIG. 15 to FIG. 18, replacing the lower lids 204, 204 provided with the deflection scanners 220 (2201, 2202) can replace the deflection scanners 220 (2201, 2202).

In this regard, in the optical scanning device 200 according to the present embodiment, as the deflection scanning member 223, a plurality of types of deflection scanning members 223-223 respectively having reflective surfaces 223a-223a with sizes that are different from each other in the main scanning direction X1 are replaceable. In this way, a plurality of types of deflection scanning members 223-223 respectively having reflective surfaces 223a-223a with sizes that are different from each other in the main scanning direction X1 can be respectively provided at the optical scanning device 200. In this example, the first deflection scanning member 2231 illustrated in FIG. 7 has the reflective surface 223a with a predetermined first size in the main scanning direction X1. The second deflection scanning member 2232 illustrated in FIG. 15 has the reflective surface 223a with a second predetermined size which is larger than the first size of the reflective surface 223a of the first deflection scanning member 2231 in the main scanning direction X1 illustrated in FIG. 7.

Further, when the optical scanning device 200 is shared by various models of image forming devices having different sizes of scanning areas a (α1, α2) (see FIG. 8, FIG. 14, and, FIG. 16 to FIG. 18) from the scanning start position to the scanning end position of the light beam L deflection-scanned by the deflection scanning member 223, for example, when the optical scanning device 200 is shared by various models of image forming devices where the size specifications [A3 size (297 mm×420 mm) and SRA3 size (320 mm×450 mm)] of the recording paper (paper P) are different, it is necessary to provide the optical scanning device 200 with a plurality of types of deflection scanning members 223 respectively having reflective surfaces 223a with sizes different from each other in the main scanning direction X1.

In this case, from the viewpoint of compactification of the housing 201, since the reflecting mirror (232) is provided in the outside vicinity of the scanning areas a (α1, α2), the arrangement position of the reflecting mirror (232) is changed between a first scanning area α1 and a second scanning area α2. Then, the incident angle of the light beam L to the reflection mirror (232) changes, so it is necessary to change mirror arrangement angles θ(θ1, θ2). In this example, the second scanning area α2 is larger than the first scanning area a1. Specifically, the first scanning area α1 is a scanning area by the first deflection scanning member 2231, and the width (width of the image area) on the scanning surface of the to-be-scanned object (photoreceptor drum 3) is 310 mm. Further, the second scanning area α2 is a scanning area by the second deflection scanning member 2232, and the width (width of the image area) on the scanning surface of the to-be-scanned object (photoreceptor drum 3) is 330 mm. Therefore, the arrangement position (second arrangement position) of the reflection mirror (232) in the second scanning area α2 is positioned outside the arrangement position (first arrangement position) of the reflection mirror (232) in the first scanning area α1. Then, the arrangement position and the mirror arrangement angle θ (θ1, θ2) of the reflection mirror (232) change between the first scanning area α1 and the second scanning area α2.

By the way, when the optical path length from the light source 211 to the beam detector 234 is different between the first arrangement position and the second arrangement position of the reflection mirror (232) to such an extent that the performance of the optical member (particularly, the condensing lens 233) is beyond the allowable level (particularly, allowable level of deviation of the optical axis), it is difficult to maintain the performance of the optical scanning device 200 unless the position of the optical axis of the optical member (233) is changed.

In this respect, in the optical scanning device 200 according to the present embodiment, the shortest distances (DA, DB, DC) are different from each other, and the shortest distances (Da, Db, Dc) are different from each other. By doing so, the position of the optical axis in the width direction T of the optical member (233) can be changed, and thereby the performance of the optical scanning device 200 can be maintained.

Third Embodiment

Figure 19A:
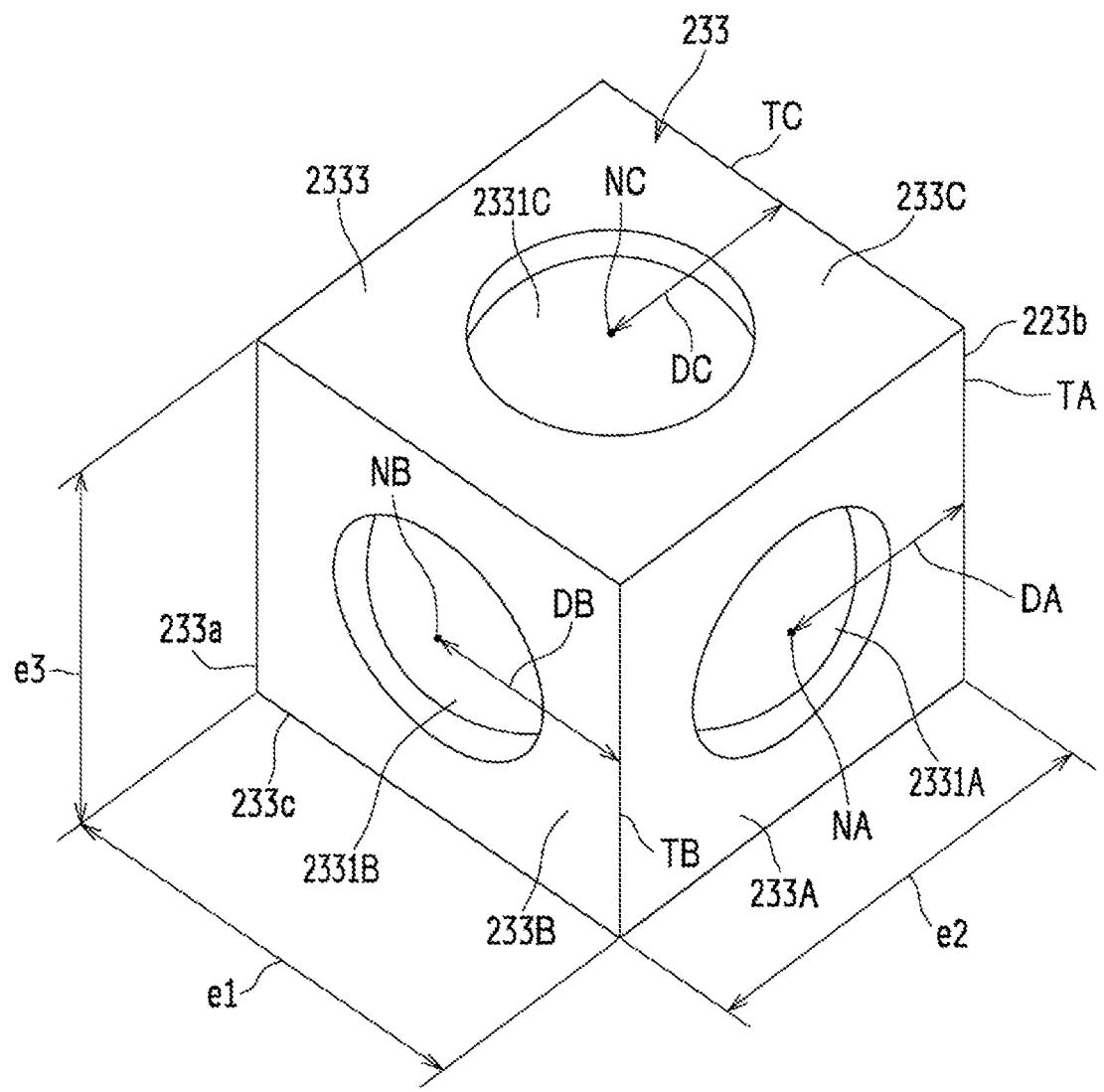
FIG. 19A is a perspective view of the optical member according to a third embodiment as viewed from one side surfaces.
Figure 19B:
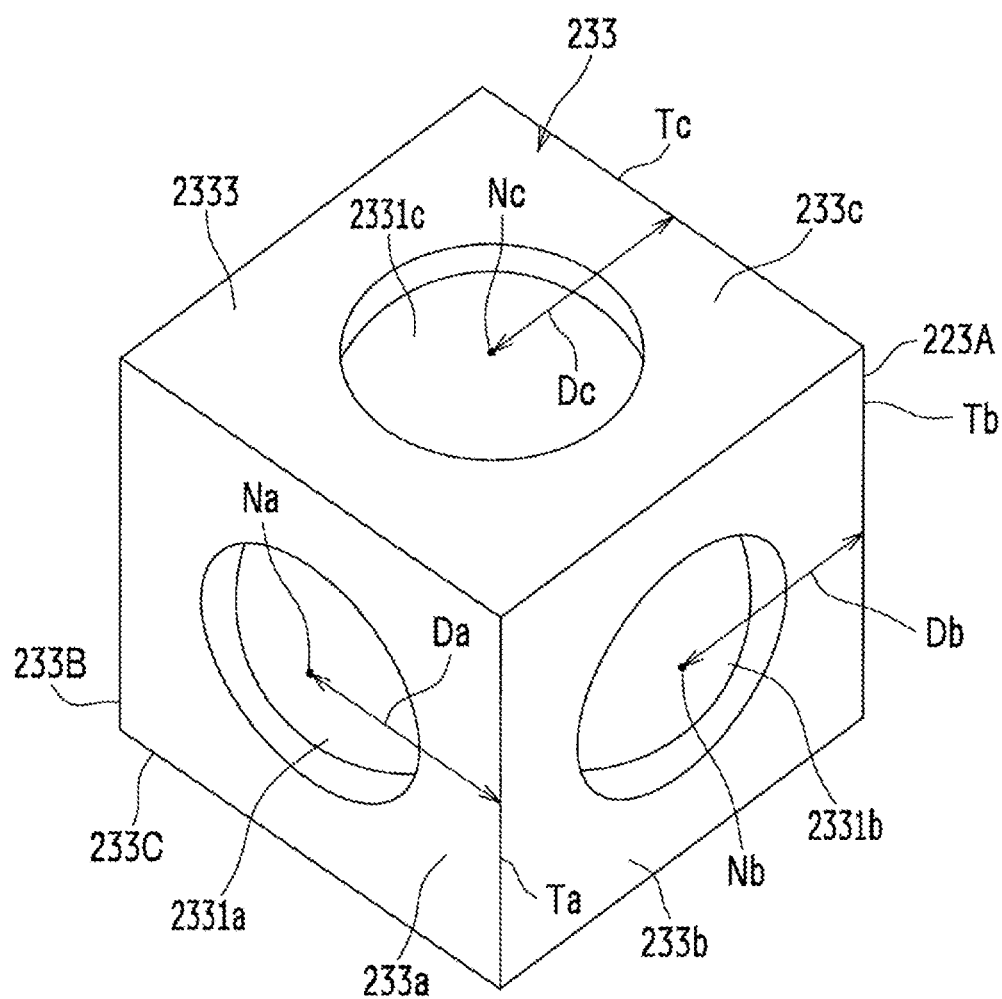
FIG. 19B is a perspective view of the optical member according to the third embodiment as viewed from the other side surfaces.

FIG. 19A and FIG. 19B are perspective views of the optical member (233) according to a third embodiment as viewed, respectively, from the one side surfaces 233A, 233B, 233C and the other side surfaces 233a, 233b, 233c.

From the optical scanning device 200 according to the first embodiment, the optical scanning device 200 according to the third embodiment is different in that the curvatures of all the lenses (2331A, 2331a), (2331B, 2331b), (2331C, 2331c) at the three pairs of surfaces (233A, 233a), (233B, 233b), (233C, 233c) are all the same. Further, in the third embodiment, the optical member is used as another lens instead of the condensing lens 233. Typical examples of the other lens include a collimator lens and a cylindrical lens.

In this example, as illustrated in FIGS. 19A and 19B, the lenses (2331A, 2331a), (2331B, 2331b), (2331C, 2331c) all have the same lens shape and are spherical lenses. Specifically, the curvatures of the lenses (2331A, 2331a), (2331B, 2331b), (2331C, 2331c) are all 0.0446 [1/mm] (curvature radius 22.4 [mm]).

In this way, by making all of the curvatures of all the lenses (2331A, 2331a), (2331B, 2331b), (2331C, 2331c) at the three pairs of surfaces (233A, 233a), (233B, 233b), (233C, 233c) the same, the above configuration can be preferably used for various lenses in an image forming device (particularly, an optical scanning device).

In the third embodiment, the curvatures of the lenses (2331A, 2331a), (2331B, 2331b), (2331C, 2331c) may be different from each other. The lenses (2331A, 2331a), (2331B, 2331b), (2331C, 2331c) may be an aspherical lens or a toroidal lens. Further, the shortest distances (DA, DB, DC) may be all the same or may be different from each other, and the shortest distances (Da, Db, Dc) may be all the same or may be different from each other.

Other Embodiments

In the first to third embodiments, the reference sides TA, TB, TC are each one side in the width direction T when the to-be-installed surface among the surfaces of the optical member (233) is installed in the housing 201. However, the reference sides TA, TB, TC each may be one side in the height direction H. Further, although the optical member (233) was used as a light-condensing material, it may be used as a diverging material.

Further, in the first to third embodiments, for example, the optical member may be used as a collimator lens. In this case, the optical member can function as the collimator lens that makes the incident light beam L substantially parallel light. Moreover, the optical member may be used as a cylindrical lens. In this case, the optical member can function as the cylindrical lens that converges the incident light beam L only in the sub-scanning direction. Other than these, for example, the optical member, of the optical scanning device or of a device other than the optical scanning device, in the image forming device can be used together with an auxiliary lens that is provided between various lenses and assists the optical characteristics of various lenses. Further, the optical member itself may be used as the auxiliary lens of the optical member, of the optical scanning device or of a device other than the optical scanning device, in the image forming device.

In any case, at least two configurations of the configurations of the first embodiment to the third embodiment may be combined.

The present invention is not limited to the embodiments described above, and can be implemented in various other forms. Therefore, the embodiments are merely exemplifications in all respects and should not be interpreted to limit the present invention. The scope of the present invention is shown by the scope of claims and is not bound at all by the text of the specification. Further, all modifications and changes belonging to the equivalent scope of the claims are within the scope of the present invention.

What is claimed is:

1. An optical member that refracts a light beam to diverge or focus the light beam, the optical member being a single lens made of a transparent material, the optical member comprising:
at least three pairs of opposing surfaces, each pair of the at least three pairs of opposing surfaces comprising one surface on which the light beam is incident and the other surface from which the incident light beam is emitted,
wherein
each of the at least three pairs of opposing surfaces includes a lens part,
curvatures of the lens parts at one side of surfaces of the respective three pairs of opposing surfaces are all the same, and
the optical member is selectively arranged to be installed in a housing by directing any one lens part of the lens parts at the one side of the surfaces to an incident side of the light beam while a corresponding one lens part of the lens parts at the other side of the surfaces is directed to an emission side of the light beam.

2. The optical member according to claim 1, wherein respective shortest distances between optical axes of the lens parts at the one side of the surfaces of the respective three pairs of opposing surfaces and reference sides, which are each any one of sides surrounding the lens parts, are all the same.

3. The optical member according to claim 1, wherein respective shortest distances between optical axes of the lens parts at the one side of the surfaces of the respective three pairs of opposing surfaces, and reference sides, which are each any one of sides surrounding the lens parts, are different from each other.

4. The optical member according to claim 1, wherein the curvatures of all the lens parts at the at least three pairs of opposing surfaces are all the same.

5. An optical member that refracts a light beam to diverge or focus the light beam, the optical member being a single lens made of a transparent material, comprising:
at least three pairs of opposing surfaces, each pair of the at least three pairs of opposing surfaces comprising one surface on which the light beam is incident and the other surface from which the incident light beam is emitted,
wherein
each of the at least three pairs of opposing surfaces includes a lens part,
curvatures of the lens parts at one side of surfaces of respective pairs of at least two pairs of the at least three pairs of opposing surfaces are different from each other,
respective shortest distances between optical axes of the lens parts at one side of the surfaces of respective pairs of the at least two pairs of surfaces and reference sides, which are each any one of respective sides surrounding surfaces including the lens parts, are different from each other, and
the optical member is selectively arranged to be installed in a housing by directing any one lens part of the lens parts at the one side of the surfaces to an incident side of the light beam while a corresponding one lens part of the lens parts at the other side of the surfaces is directed to an emission side of the light beam.

6. The optical member according to claim 1, wherein
at least one lens part of the lens parts at the at least three pairs of opposing surfaces is a convex lens part, and
the convex lens part does not protrude from the surface in which the convex lens part is provided.

7. The optical member according to claim 1, wherein the at least three pairs of opposing surfaces form a cube.

8. An optical scanning device comprising the optical member according to claim 1.

9. The optical scanning device according to claim 8, wherein each of the lens parts has a spherical surface on the incident side of the light beam and a toroidal surface on the emission side of the light beam.

10. The optical scanning device according to claim 8, further comprising:
a beam detector that receives the light beam emitted from a light source; and
a deflection scanning member that deflection-scans in a predetermined main scanning direction,
wherein
a plurality of types of beam detectors, having incident positions different from each other in an incident direction in which the light beam is incident, is mountable.

11. The optical scanning device according to claim 10, wherein
the deflection scanning member includes a plurality of types of deflection scanning members respectively having reflective surfaces with sizes that are different from each other in the main scanning direction, and
the plurality of types of the deflection scanning members is replaceable.

12. An image forming device comprising the optical scanning device according to claim 8.

13. The optical member according to claim 5, wherein
at least one lens part of the lens parts in the at least three pairs of opposing surfaces is a convex lens part, and
the convex lens part does not protrude from the surface in which the convex lens part is provided.

14. The optical member according to claim 5, wherein the at least three pairs of opposing surfaces form a cube.

15. An optical scanning device comprising the optical member according to claim 5.

16. The optical scanning device according to claim 15, wherein each of the lens parts has a spherical surface on the incident side of the light beam and a toroidal surface on the emission side of the light beam.

17. The optical scanning device according to claim 15, further comprising:
a beam detector that receives the light beam emitted from a light source; and
a deflection scanning member that deflection-scans in a predetermined main scanning direction,
wherein
a plurality of types of beam detectors, having incident positions different from each other in an incident direction in which the light beam is incident, is mountable.

18. The optical scanning device according to claim 17 wherein
the deflection scanning member includes a plurality of types of deflection scanning members respectively having reflective surfaces with sizes that are different from each other in the main scanning direction, and
the plurality of types of the deflection scanning members is replaceable.

19. An image forming device comprising the optical scanning device according to claim 15.

20. An optical scanning device comprising an optical member that refracts a light beam to diverge or focus the light beam, wherein
the optical member includes at least three pairs of opposing surfaces,
each of the at least three pairs of opposing surfaces includes a lens part,
curvatures of the lens parts at one side of surfaces of the respective three pairs of opposing surfaces are all the same,
each of the lens parts has a spherical surface on an incident side of the light beam and a toroidal surface on an emission side of the light beam, and
the toroidal surface is a surface having a curvature in one direction but not having any curvature in a direction orthogonal to the one direction.

* * * * *